US011681553B2

(12) United States Patent
Cho et al.

(10) Patent No.: US 11,681,553 B2
(45) Date of Patent: Jun. 20, 2023

(54) STORAGE DEVICES INCLUDING HETEROGENEOUS PROCESSORS WHICH SHARE MEMORY AND METHODS OF OPERATING THE SAME

(71) Applicant: Samsung Electronics Co., Ltd., Suwon-si (KR)

(72) Inventors: Hanmin Cho, Seoul (KR); Suengchul Ryu, Hwaseong-si (KR); Junghyun Hong, Hwaseong-si (KR)

(73) Assignee: Samsung Electronics Co., Ltd.

( * ) Notice: Subject to any disclaimer, the term of this patent is extended or adjusted under 35 U.S.C. 154(b) by 815 days.

(21) Appl. No.: 16/562,623

(22) Filed: Sep. 6, 2019

(65) Prior Publication Data
US 2020/0159584 A1 May 21, 2020

(30) Foreign Application Priority Data
Nov. 16, 2018 (KR) .................. 10-2018-0141742

(51) Int. Cl.
*G06F 12/02* (2006.01)
*G06F 9/50* (2006.01)
(Continued)

(52) U.S. Cl.
CPC .......... *G06F 9/5016* (2013.01); *G06F 9/5027* (2013.01); *G06F 12/0207* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 3,737,873 A * 6/1973 Puccini .................... H04Q 3/54
379/284
3,944,974 A * 3/1976 Buscher ............... G06F 11/188
714/821

(Continued)

FOREIGN PATENT DOCUMENTS

KR     10-1813251     12/2017

OTHER PUBLICATIONS

J. Zhang, G. Park, D. Donofrio, J. Shalf and M. Jung, "DRAM-Less: Hardware Acceleration of Data Processing with New Memory," 2020 IEEE International Symposium on High Performance Computer Architecture (HPCA), San Diego, CA, USA, 2020, pp. 287-302, doi: 10.1109/HPCA47549.2020.00032. (Year: 2020).*

(Continued)

*Primary Examiner* — Daniel C. Chappell
(74) *Attorney, Agent, or Firm* — Myers Bigel, P.A.

(57) ABSTRACT

A storage device includes an accelerator including a first processor, and a storage controller that uses a buffer memory as a working memory and includes a second processor different in type from the first processor. The second processor is configured to establish a first communication path between the first processor and the buffer memory responsive to a request of the first processor, and the first processor is configured to access the buffer memory through the first communication path.

20 Claims, 18 Drawing Sheets

(51) Int. Cl.
*G06F 13/16* (2006.01)
*G06N 3/06* (2006.01)

(52) U.S. Cl.
CPC ........... *G06F 13/1673* (2013.01); *G06N 3/06* (2013.01); *G06F 2212/657* (2013.01); *G06F 2212/7201* (2013.01)

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 4,141,067 A * | 2/1979 | McLagan | G06F 12/0806 | 711/146 |
| 4,385,206 A * | 5/1983 | Bradshaw | H04Q 11/0407 | 709/248 |
| 5,428,801 A * | 6/1995 | Murano | G06F 40/53 | 709/213 |
| 6,525,739 B1 * | 2/2003 | Gurumoorthy | G06F 12/0284 | 345/566 |
| 6,901,488 B2 * | 5/2005 | Gruner | G06F 12/0831 | 711/119 |
| 7,127,549 B2 * | 10/2006 | Sinclair | G06F 3/0656 | 711/111 |
| 7,536,669 B1 * | 5/2009 | Anderson | G06F 30/34 | 710/308 |
| 7,831,801 B1 * | 11/2010 | Anderson | G06F 13/28 | 712/11 |
| 8,719,543 B2 * | 5/2014 | Kaminski | G06F 9/5016 | 711/208 |
| 8,719,547 B2 * | 5/2014 | Chinya | G06F 12/1036 | 711/202 |
| 8,860,741 B1 * | 10/2014 | Juffa | G09G 5/363 | 345/530 |
| 9,286,225 B2 | 3/2016 | Mehrotra et al. | | |
| 9,400,702 B2 * | 7/2016 | Chen | G06F 12/1072 | |
| 11,436,048 B2 * | 9/2022 | Tan | G06F 9/546 | |
| 2004/0123123 A1 * | 6/2004 | Buer | H04L 63/164 | 713/176 |
| 2005/0097231 A1 * | 5/2005 | Hofstee | G09G 5/14 | 710/8 |
| 2006/0064546 A1 * | 3/2006 | Arita | G06F 9/3824 | 712/E9.046 |
| 2007/0266199 A1 * | 11/2007 | Peled | G06F 12/0842 | 711/E12.039 |
| 2008/0005296 A1 * | 1/2008 | Lee | H04L 49/901 | 709/223 |
| 2010/0023700 A1 * | 1/2010 | Chen | G06F 8/4442 | 711/170 |
| 2010/0023709 A1 * | 1/2010 | Feng | H04N 19/91 | 711/E12.001 |
| 2010/0149199 A1 * | 6/2010 | Jacoby | G06F 9/5016 | 345/541 |
| 2010/0309223 A1 * | 12/2010 | Roth | G06T 5/50 | 711/E12.001 |
| 2011/0161619 A1 * | 6/2011 | Kaminski | G06F 12/1027 | 711/E12.016 |
| 2012/0167102 A1 * | 6/2012 | Chang | G06F 9/5027 | 718/102 |
| 2012/0246403 A1 * | 9/2012 | McHale | G06F 3/0685 | 711/E12.019 |
| 2012/0278725 A1 * | 11/2012 | Gordon | H04N 21/858 | 715/738 |
| 2013/0031333 A1 * | 1/2013 | Sankaran | G06F 12/1027 | 711/207 |
| 2013/0329491 A1 * | 12/2013 | Chang | G11C 5/04 | 365/158 |
| 2014/0129753 A1 * | 5/2014 | Schuette | G06F 13/4068 | 710/301 |
| 2014/0130119 A1 * | 5/2014 | Goldschlag | H04L 63/101 | 726/1 |
| 2014/0351555 A1 * | 11/2014 | Nilsson | G06F 9/35 | 711/215 |
| 2016/0179427 A1 * | 6/2016 | Jen | G06F 13/385 | 711/147 |
| 2017/0285968 A1 * | 10/2017 | Jung | G06F 3/0604 | |
| 2018/0024612 A1 * | 1/2018 | Louie | G06F 12/00 | 713/320 |
| 2018/0024739 A1 | 1/2018 | Schmisseur | | |
| 2018/0024944 A1 * | 1/2018 | Zeng | G06F 12/1416 | 711/152 |
| 2018/0052776 A1 * | 2/2018 | Zhao | G06F 12/109 | |
| 2018/0059939 A1 | 3/2018 | He et al. | | |
| 2018/0074727 A1 * | 3/2018 | Zhao | G06F 3/0613 | |
| 2018/0246828 A1 * | 8/2018 | Choi | G06F 13/37 | |
| 2019/0205269 A1 * | 7/2019 | Fleming, Jr. | G06F 13/1673 | |
| 2019/0227936 A1 * | 7/2019 | Jang | G06F 9/545 | |
| 2022/0066828 A1 * | 3/2022 | Chappalli | G06F 9/5016 | |

OTHER PUBLICATIONS

L. Bertaccini, L. Benini and F. Conti, "To Buffer, or Not to Buffer? A Case Study on FFT Accelerators for Ultra-Low-Power Multicore Clusters," 2021 IEEE 32nd International Conference on Application-specific Systems, Architectures and Processors (ASAP), NJ, USA, 2021, pp. 1-8 (Year: 2021).*

S. Rahamneh and L. Sawalha, "An OpenCL-Based Acceleration for Canny Algorithm Using a Heterogeneous CPU-FPGA Platform," 2019 IEEE 27th Annual International Symposium on Field-Programmable Custom Computing Machines (FCCM), San Diego, CA, USA, 2019, pp. 322-322, doi: 10.1109/FCCM.2019.00063. (Year: 2019).*

M. Dehyadegari, A. Marongiu, M. R. Kakoee, L. Benini, S. Mohammadi and N. Yazdani, "A tightly-coupled multi-core cluster with shared-memory HW accelerators," 2012 International Conference on Embedded Computer Systems (SAMOS), Samos, Greece, 2012, pp. 96-103, doi: 10.1109/SAMOS.2012.6404162. (Year: 2112).*

* cited by examiner

STORAGE DEVICES INCLUDING HETEROGENEOUS PROCESSORS WHICH SHARE MEMORY AND METHODS OF OPERATING THE SAME

CROSS-REFERENCE TO RELATED APPLICATION

This application claims priority under 35 U.S.C. § 119 to Korean Patent Application No. 10-2018-0141742, filed on Nov. 16, 2018 in the Korean Intellectual Property Office, the entire contents of which are incorporated by reference herein.

TECHNICAL FIELD

Aspects of the present disclosure relate to storage devices, and more particularly, relate to storage devices including heterogeneous processors mutually sharing a memory and operating methods of storage devices including heterogeneous processors mutually sharing a memory.

BACKGROUND

Attempts have been made to improve a processing speed of an electronic device by combining a processor and an accelerator. For example, high-capacity storage devices having an accelerator-based platform, such as a solid state drive (SSD), are being developed.

However, in an electronic device including an accelerator, data exchange between an operation of a controller and an acceleration operation of the accelerator may occur. For this reason, data exchanges between the controller and the accelerator are performed through an external host memory, which may cause a bottleneck between the host memory and the accelerator or between the host memory and the controller. Also, even when direct communication between the controller and the accelerator is implemented, the data exchange may cause issues such as an increase in load, reduction of performance, and/or lack of memory.

SUMMARY

Embodiments of the inventive concepts provide a memory sharing scheme of a storage device including heterogeneous processors.

According to an example embodiment, a storage device may include an accelerator including a first processor, and a storage controller that is configured to use a buffer memory as a working memory and includes a second processor different in type from the first processor. The second processor may configured to establish a first communication path between the first processor and the buffer memory responsive to a request of the first processor, and the first processor may be configured to access the buffer memory through the first communication path.

According to an example embodiment, a controller may include a first processor, a second processor that uses a buffer memory as a working memory and having a different type from the first processor, and a bus electrically connects the first processor and the second processor. The second processor may be configured to establish a first communication path between the first processor and the buffer memory responsive to a request of the first processor.

According to an example embodiment, a method of operating a storage device which includes a first processor and a second processor that is different in type from the first processor may include requesting, by the first processor, an access to a buffer memory of the second processor, allocating, by the second processor, a virtual address corresponding to a physical address of at least a part of the buffer memory to the first processor, and accessing, by the first processor, the buffer memory with reference to the allocated virtual address.

BRIEF DESCRIPTION OF THE FIGURES

The above and other objects and features of the inventive concepts will become apparent by describing in detail example embodiments thereof with reference to the accompanying drawings.

DETAILED DESCRIPTION

Herein, aspects of the present disclosure and various examples of embodiments are described in detail with sufficient clarity that one of ordinary skill in the art may implement the inventive concepts without undue experimentation.

In the present disclosure, some components may be described with reference to terms such as "unit", "module", "~er or ~or", etc., and function blocks may be illustrated in drawings. Such components and/or such function blocks may be implemented in software, hardware, and/or a combination thereof. In some embodiments, the software may include a machine code, firmware, an embedded code, and/or application software. In some embodiments, the hardware may include an electrical circuit, an electronic circuit, a processor, a computer, an integrated circuit, integrated circuit cores, a pressure sensor, an inertial sensor, a microelectromechanical system (MEMS), a passive element, and/or a combination thereof.

Figure 1:
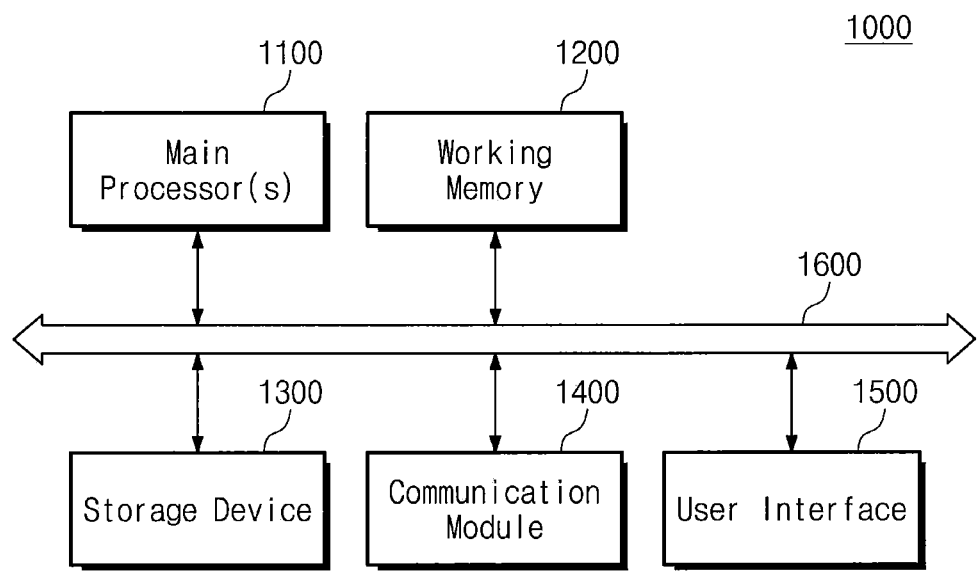
FIG. 1 is a block diagram illustrating an example configuration of an electronic system according to an embodiment of the present disclosure.

FIG. 1 is a block diagram illustrating an example configuration of an electronic system 1000 according to some embodiments of the present disclosure.

The electronic system 1000 may include a main processor 1100, a working memory 1200, a storage device 1300, a communication module 1400, a user interface 1500, and a system bus 1600. In some embodiments, the electronic system 1000 may be or may include electronic systems such as a desktop computer, a laptop computer, a tablet, a smartphone, a wearable device, a video game console, a workstation, a server, and/or an electric vehicle, as examples.

The main processor 1100 may control overall operations of the electronic system 1000. For example, the main processor 1100 may perform and/or process various kinds of arithmetic and/or logical operations. As examples, the main processor 1100 may be implemented with a general-purpose processor, a dedicated processor, a special-purpose processor, or an application processor, and may include one processor core or two or more processor cores.

The working memory 1200 may store data to be used for an operation of the electronic system 1000. For example, the working memory 1200 may temporarily store data processed or to be processed by the main processor 1100. For example, the working memory 1200 may include a volatile memory, such as a dynamic random access memory (DRAM), a synchronous DRAM (SDRAM), or the like, and/or a nonvolatile memory, such as a phase-change RAM (PRAM), a magneto-resistive RAM (MRAM), a resistive RAM (ReRAM), a ferroelectric RAM (FRAM), or the like.

The storage device 1300 may include at least one of nonvolatile memory devices such as a flash memory, a phase change random access memory (PRAM), a magnetic RAM (MRAM), a resistive RAM (ReRAM), and a ferroelectric RAM (FRAM). In addition, the storage device 1300 may include at least one volatile memory device (or a buffer memory), which is necessary to process data stored or to be stored in a nonvolatile memory device, such as a dynamic RAM (DRAM). For example, the storage device 1300 may be implemented with a storage medium including one or more solid state drives.

The communication module 1400 may support at least one of various wireless/wired communication protocols for communicating with an external device/system of the electronic system 1000. The user interface 1500 may include various input/output interfaces for arbitrating communication between a user and the electronic system 1000.

The system bus 1600 may provide a communication path between the components of the electronic system 1000. The components of the electronic system 1000 may exchange data with each other in compliance with a bus format of the system bus 1600. For example, the system bus 1600 may support one or more of various interface protocols such as a peripheral component interconnect express (PCIe) protocol, a nonvolatile memory express (NVMe) protocol, a universal flash storage (UFS) protocol, a serial advanced technology attachment (SATA) protocol, a small computer system interface (SCSI) protocol, a serial attached SCSI (SAS) protocol, a generation-Z (Gen-Z) protocol, a cache coherent interconnect for accelerators (CCIX) protocol, and/or an open coherent accelerator processor interface (OpenCAPI) protocol.

Figure 2:
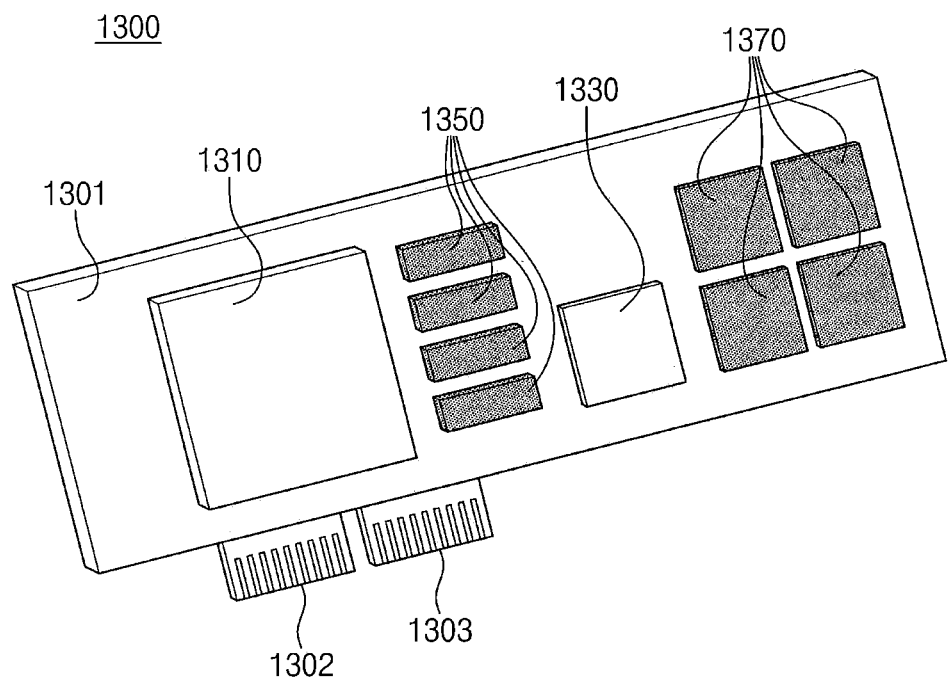
FIG. 2 illustrates an example implementation of an electronic system of FIG. 1.

FIG. 2 illustrates an example implementation of the electronic system 1000 of FIG. 1.

In an embodiment, the storage device 1300 may include a printed circuit board (PCB) 1301. The storage device 1300 may include one or more chips or packages mounted or installed on the PCB 1301. For example, a storage controller 1330, an accelerator 1310, buffer memories 1350, and nonvolatile memory devices 1370 may be mounted or installed on the PCB 1301.

The accelerator 1310 may perform an acceleration operation for improving a processing speed of operations that the storage controller 1330 performs. To this end, the accelerator 1310 may include a hardware acceleration device configured to perform the acceleration operation. For example, the accelerator 1310 may include a graphics processing unit (GPU), a neural network processing unit (NNPU), a field programmable gate array (FPGA), an application-specific integrated circuit (ASIC), a digital signal processor (DSP), etc.

Though the accelerator 1310 is illustrated as a separate element in FIG. 2, this is only an example and the inventive concepts are not limited thereto. In some embodiments, a function of the accelerator 1310 may be embedded in the storage controller 1330. For example, in the case where the GPU, the NNPU, the FPGA, etc. are implemented within the storage controller 1330, the storage controller 1330 may be implemented with a system-on-chip including heterogeneous processors. In particular, in the case where a function of the FPGA is implemented within the storage controller 1330, the FPGA may be referred to as an embedded FPGA (eFPGA).

The storage controller 1330 may control and/or manage overall operations of the storage device 1300. To this end, the storage controller 1330 may include a hardware circuit (e.g., an analog circuit and/or a logic circuit) configured to perform intended operations. Alternatively or additionally, the storage controller 1330 may include one or more processors configured to execute an instruction set of a program code for performing intended operations.

The buffer memories 1350 may be used as working memories for an acceleration operation of the accelerator 1310 and/or an operation of the storage controller 1330. For example, a part of the buffer memories 1350 may be buffer memories dedicated to the accelerator 1310, and the rest thereof may be buffer memories dedicated to the storage controller 1330. For example, the buffer memories 1350 may be implemented with, but are not limited to, DRAM. Meanwhile, according to example embodiments of the present disclosure, a storage space of at least a portion of a buffer memory dedicated to the storage controller 1330 may be shared by the accelerator 1310. In some embodiments, a storage space of at least a portion of a buffer memory dedicated to the accelerator 1310 may be shared by the storage controller 1330. This will be described in detail later.

The nonvolatile memory devices 1370 may be implemented with a flash memory device, a PRAM, an MRAM, a RRAM, a FeRAM, etc., as examples. In particular, in the case where the nonvolatile memory devices 1370 include NAND-type flash memories, the nonvolatile memory devices 1370 may include an array of memory cells that are formed in a direction perpendicular to a substrate and are formed along a plurality of word lines and a plurality of bit lines.

In an embodiment, the storage device 1300 may be supplied with power from the outside through a connector 1302, and may perform communication (e.g., exchange data) with the main processor 1100 (refer to FIG. 1) through a connector 1303. Meanwhile, the connector 1303 through which data are exchanged is not intended to indicate only a single port, and should be understood as including the case of indicating a dual-port and/or a multi-port connector.

Figure 3:
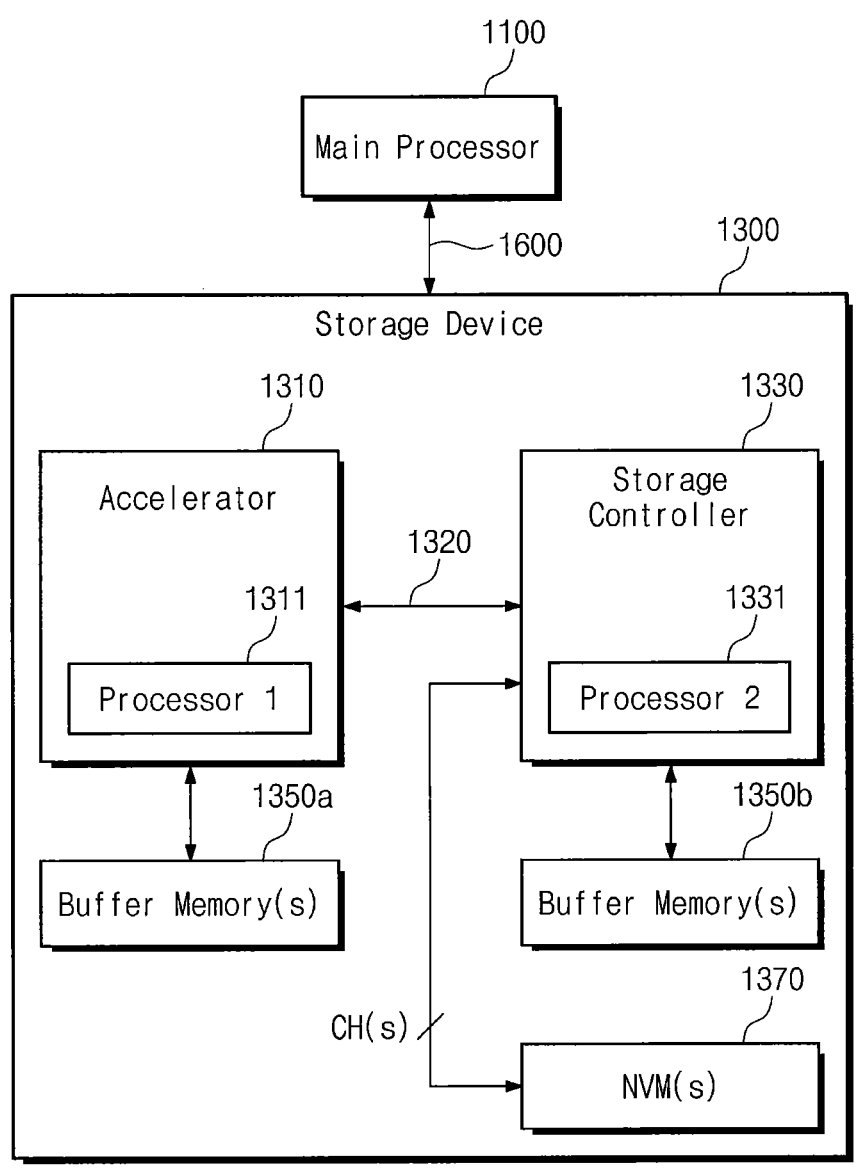
FIG. 3 illustrates an example configuration of a storage device of FIG. 1.

FIG. 3 illustrates an example configuration of the storage device 1300 of FIG. 1. The storage device 1300 may include the accelerator 1310, the storage controller 1330, buffer memories 1350a and 1350b, and the nonvolatile memory device(s) 1370.

In an embodiment, the accelerator 1310 and the storage controller 1330 may communicate with each other in a peer-to-peer manner. That is, the accelerator 1310 may perform communication with the storage controller 1330 without direct intervention of the main processor 1100. For example, data may be exchanged between the accelerator 1310 and the storage controller 1330 without passing through a host memory (e.g., the working memory 1200 of FIG. 1). For example, data may be exchanged (e.g., electrically) through a bus 1320 between the accelerator 1310 and the storage controller 1330.

The storage controller 1330 may communicate with the main processor 1100 through the system bus 1600. The storage controller 1330 may be allocated tasks from the main processor 1100, and may perform an operation associated with the allocated tasks. Here, an operation may mean a general operation, not an acceleration operation. In some embodiments, the storage controller 1330 may perform an operation associated with a task in response to a request of the main processor 1100. The storage controller 1330 may include the second processor 1331 for performing an operation. For example, the second processor 1331 may be implemented with a central processing unit (CPU).

The accelerator 1310 may perform an acceleration operation on a task allocated from the main processor 1100. In some embodiments, the accelerator 1310 may accelerate an operation of the second processor 1331. The accelerator 1310 may include a first processor 1311 that is different from the second processor 1331 in type (e.g., the first processor 1311 and the second processor 1331 are heterogeneous). As used herein, processors may be of different types if, for example, they are different brands, models, different architectures, different speeds, different bus widths (e.g., a data bus), and/or different architectures. For example, a processor that is a GPU may be a different type from a processor that is an FPGA. In an embodiment, the first processor 1311 may be a GPU, an NNPU, etc. In particular, in the case where the accelerator 1310 is implemented with an FPGA, the first processor 1311 may be implemented with a reconfigurable logic circuit. However, the first processor 1311 is only provided as an example, and the inventive concepts are not limited thereto. For example, the case where the first processor 1311 is implemented with a processor different in type from the second processor 1331 may be incorporated in the scope and spirit of the inventive concepts.

Buffer memories 1350a and 1350b may be buffer memories dedicated to and/or used by the first processor 1311 and the second processor 1331, respectively. Here, the expression "dedicated to the first processor 1311" is not intended to exclude the use of the buffer memory 1350a by any other components of the accelerator 1310. As in the above description, the expression "dedicated to the second processor 1331" is not intended to exclude the use of the buffer memory 1350b by any other components of the storage controller 1330.

The nonvolatile memory devices 1370 may communicate with the storage controller 1330 through a plurality of channels CH. Under control of the storage controller 1330, the nonvolatile memory devices 1370 may store data and/or may output the stored data. For example, at least a portion of data stored in the nonvolatile memory devices 1370 may be used for the acceleration operation by the first processor 1311 and/or an operation by the second processor 1331.

Meanwhile, in the storage device 1300 according to an example embodiment of the present disclosure, the first processor 1311 may access the buffer memory 1350b dedicated to and/or used by the second processor 1331. For example, in the case where a capacity of the buffer memory 1350a used for the acceleration operation is insufficient, the first processor 1311 may access the buffer memory 1350b. For example, an access for securing a memory space is referred to as a first type access. In some embodiments, the first processor 1311 may access the buffer memory 1350b for obtaining data that are processed or are being processed by the second processor 1331. For example, an access for obtaining data is referred to as a second type access.

As in the above description, the second processor 1331 may access the buffer memory 1350a dedicated to and/or used by the first processor 1311. For example, in the case where a capacity of the buffer memory 1350b used for an operation is insufficient, the second processor 1331 may access the buffer memory 1350a. In some embodiments, the second processor 1331 may access the buffer memory 1350a for obtaining data that are processed or are being processed by the first processor 1311.

In particular, in the case of a conventional storage device which does not support a peer-to-peer manner, for the first processor 1311 to obtain data stored in the buffer memory 1350b, the data stored in the buffer memory 1350b may be first copied to a host memory (e.g., the working memory 1200 of FIG. 1) and then may be copied to the buffer memory 1350a, and vice versa. In this case, a bottleneck may occur between the main processor 1100 and the storage device 1300.

In addition, even though a conventional storage device supports a peer-to-peer manner, the data stored in the buffer memory 1350b may be first copied to the buffer memory 1350a for the first processor 1311 to use data stored in the buffer memory 1350b.

However, according to the present disclosure, the first processor 1311 may access the buffer memory 1350b for securing a sufficient space necessary for the acceleration operation and/or for obtaining data necessary for the acceleration operation. The second processor 1331 may access the buffer memory 1350a for securing a sufficient space necessary for an operation and/or for obtaining data necessary for the operation. Therefore, an operating speed of the first and second processors 1311 and 1331 may be improved, and data of a buffer memory may be prevented from being unnecessarily copied to any other buffer memory.

Figure 4:
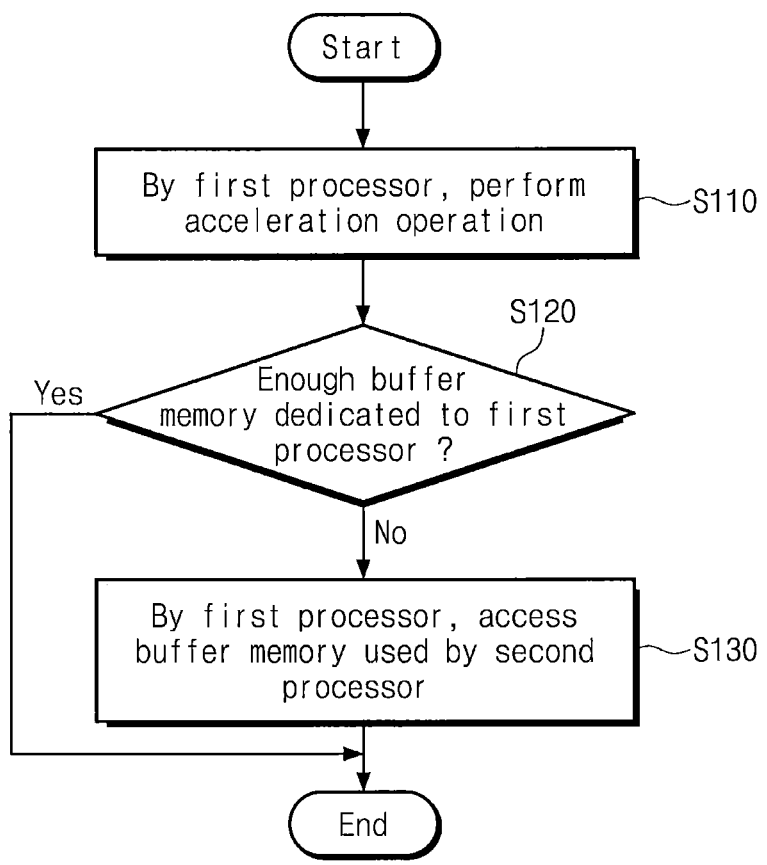
FIG. 4 is a flowchart illustrating an operating method of a storage device of FIG. 3.

FIG. 4 is a flowchart illustrating an operating method of a storage device 1300 of FIG. 3. For better understanding, a description will be given with reference to FIG. 3 together.

In operation S110, the first processor 1311 may perform the acceleration operation on a task allocated from the main processor 1100 and/or the acceleration operation according to a request of the main processor 1100. In some embodiments, the first processor 1311 may accelerate an operation of the second processor 1331. For example, the acceleration operation may be performed on, but is not limited to, data stored in the nonvolatile memory devices 1370.

In operation S120, whether a capacity of the buffer memory 1350a dedicated to the first processor 1311 is sufficient to perform the acceleration operation is determined. When the remaining capacity of the buffer memory 1350a is sufficient (Yes), the method may be terminated as the acceleration operation is continuously performed by the first processor 1311. In contrast, when the remaining capacity of the buffer memory 1350a is insufficient (No), operation S130 may be performed.

In operation S130, the first processor 1311 may access a space of the buffer memory 1350b that is allocated and may use the allocated space as a space for performing the acceleration operation. In an embodiment, the first processor 1311 may perform read and write operations on the space of the buffer memory 1350b allocated to the first processor 1311.

In an embodiment, an access of the first processor 1311 to the buffer memory 1350b may be based on a virtual address corresponding to a physical address of the buffer memory 1350b managed by the second processor 1331. For example, the virtual address may be stored in an internal memory (e.g., a cache memory) of the second processor 1331 or an internal memory of the storage controller 1330. For example, the second processor 1331 may provide the first processor 1311 with information about a virtual address allocated to the first processor 1311 through the bus 1320 or a separate dedicated bus (not illustrated).

Figure 5:
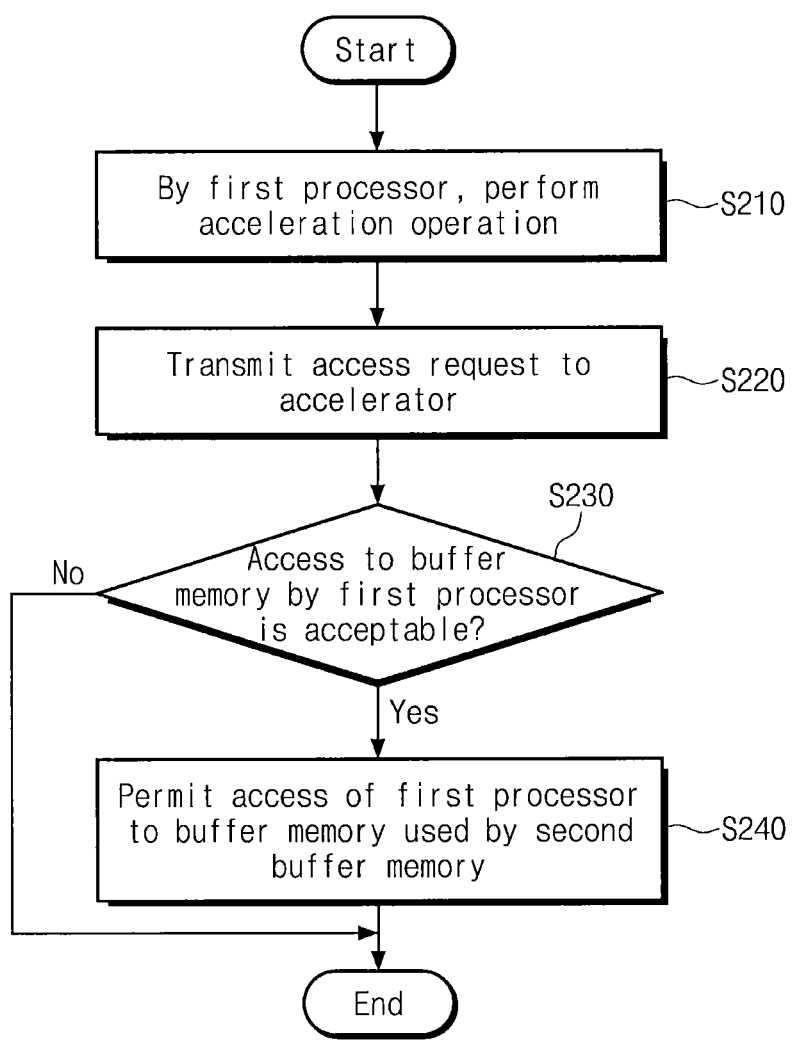
FIG. 5 is a flowchart illustrating an operating method of a storage device of FIG. 3.

FIG. 5 is a flowchart illustrating an operating method of a storage device 1300 of FIG. 3. Unlike FIG. 4, the embodiment of FIG. 5 discloses an access for obtaining data, not securing a memory space. For better understanding, a description will be given with reference to FIG. 3 together.

In operation S210, the first processor 1311 may perform the acceleration operation on a task in response to a request of the main processor 1100. In some embodiments, the first processor 1311 may perform the acceleration operation on a task allocated from the main processor 1100.

In operation S220, the first processor 1311 may transmit an access request to the buffer memory 1350b dedicated to and/or used by the second processor 1331 to the storage controller 1330. In an embodiment, an access request to the buffer memory 1350b may be a request for reading data directly or indirectly associated with performing the acceleration operation by the first processor 1311.

In operation S230, whether an access request of the first processor 1311 to the buffer memory 1350b is acceptable may be determined. In an embodiment, in the case where access is not acceptable, (e.g., a case where a security on data stored in an access-requested area of the buffer memory 1350b is required and/or in the case where the access request is associated with a write request), the second processor 1331 may deny the access request of the first processor 1311 (No of operation S230), and the method may be terminated.

In contrast, in the case where the access request of the first processor 1311 to the buffer memory 1350b is acceptable (Yes of operation S230), the first processor 1311 may directly access the buffer memory 1350b (S240). In an embodiment, the first processor 1311 may access the buffer memory 1350b, based on a virtual address of the buffer memory 1350b managed by the second processor 1331.

In some embodiments, since data directly or indirectly associated with the acceleration operation of the first processor 1311 are stored in an area access-requested by the first processor 1311 and the first processor 1311 directly reads the data associated with the acceleration operation, a partial area of the buffer memory 1350b may be shared by the first processor 1311 and the second processor 1331.

Figure 6:
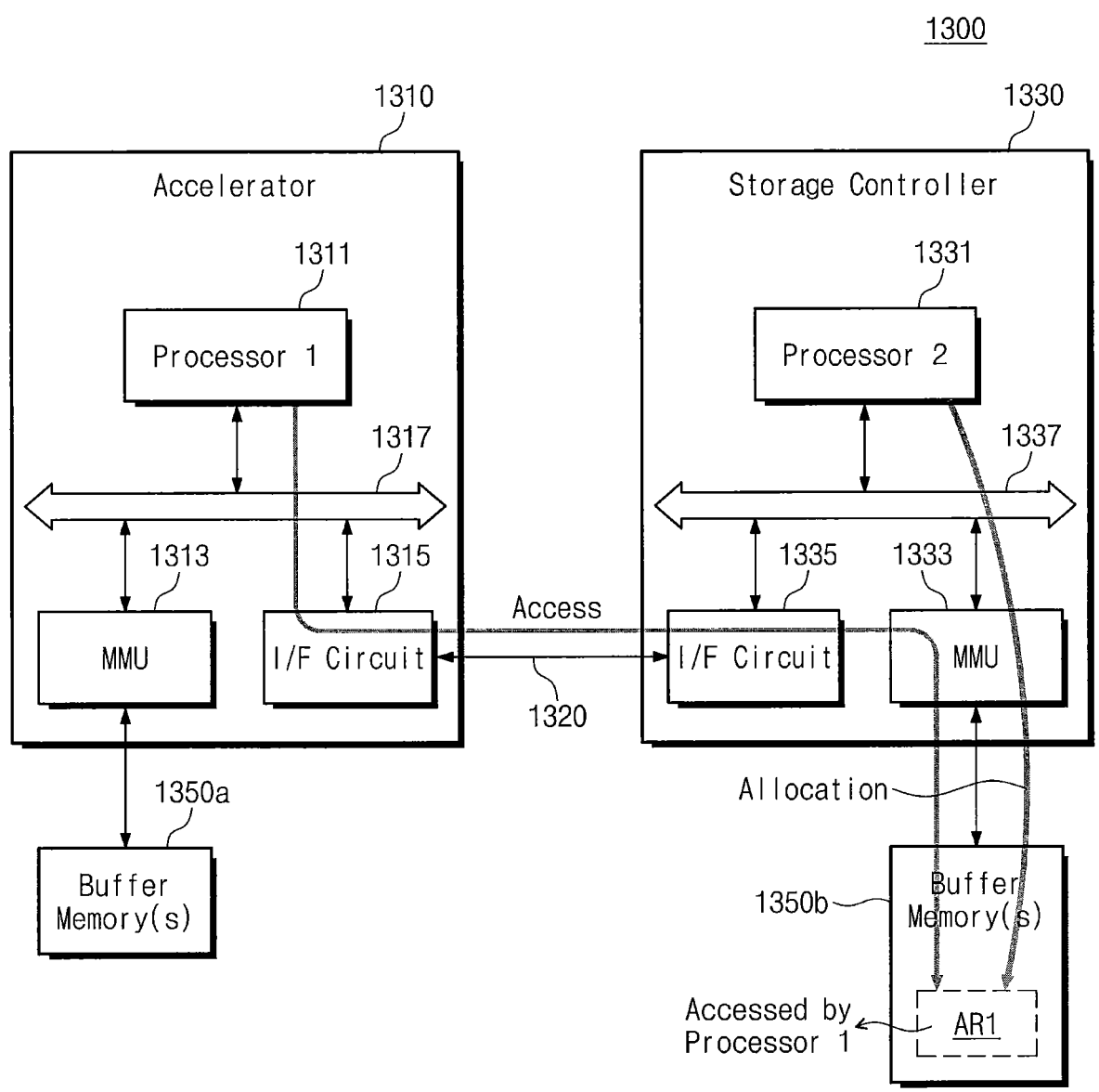
FIG. 6 illustrates an example configuration of a storage device of FIG. 3.

FIG. 6 illustrates an example configuration of a storage device 1300 of FIG. 3. For example, in the embodiment of FIG. 6, a way to secure an additional memory in the case where a capacity of the buffer memory 1350a used by the accelerator 1310 is insufficient will be described.

In an embodiment, the accelerator 1310 and the storage controller 1330 may communicate with each other in a peer-to-peer manner. That is, in performing communication between the accelerator 1310 and the storage controller 1330, intervention (or involvement) of a host device (e.g., the main processor 1100 of FIG. 1) may not be used. For example, the first processor 1311 may request an access to the buffer memory 1350b from the second processor 1331 through the bus 1320, and the second processor 1331 may request an access to the buffer memory 1350a from the first processor 1311 through the bus 1320.

The accelerator 1310 may include the first processor 1311 that performs the acceleration operation on a task allocated from the main processor 1100 (refer to FIG. 1) and/or on a task according to a request of the main processor 1100. The storage controller 1330 may include the second processor 1331 that performs an operation on a task allocated from the main processor 1100 and/or on a task according to a request of the main processor 1100.

The accelerator 1310 and the storage controller 1330 may include a memory management unit 1313 and a memory management unit 1333, respectively. The memory management units 1313 and 1333 may control data input/output operations of the buffer memories 1350a and 1350b, respectively. For example, the memory management units 1313 and 1333 may translate virtual addresses respectively managed by the first and second processors 1311 and 1331 to physical addresses. For example, the translated physical addresses may indicate physical addresses of the buffer memories 1350a and 1350b.

The accelerator 1310 and the storage controller 1330 may include an interface circuit 1315 and an interface circuit 1335, respectively. The interface circuits 1315 and 1335 provide an overall environment necessary to perform communication between the accelerator 1310 and the storage controller 1330. In an embodiment, the interface circuits 1315 and 1335 may be connected through the bus 1320. For example, the bus 1320 may support one or more of various interface protocols such as PCIe, NVMe, UFS, SATA, SAS, Gen-Z, CCIX, and OpenCAPI, as examples.

In an embodiment, each of the interface circuits 1315 and 1335 may include a layer (e.g., a PHY layer) necessary to transmit/receive various forms of signals and packets exchanged between the accelerator 1310 and the storage controller 1330. Each of the interface circuits 1315 and 1335 may include a layer (e.g., a link layer) necessary to convert and/or process various forms of signals and packets exchanged between the accelerator 1310 and the storage controller 1330. In addition, each of the interface circuits 1315 and 1335 may include various layers managing a communication path of a communicated signal or packet and/or detecting/correcting an error.

Continuing to refer to FIG. 6, in the case where the first processor 1311 performs the acceleration operation associated with a task, a capacity of the buffer memory 1350a may be insufficient. The first processor 1311 may transmit an access request for the buffer memory 1350b to the second processor 1331, and the second processor 1331 may allocate at least a portion AR1 of a memory area, which is not currently being used, to a memory area for the first processor 1311.

In an embodiment, the second processor 1331 may manage a virtual address corresponding to a physical address of the allocated area AR1 and may provide the virtual address to the first processor 1311. The first processor 1311 may directly access the buffer memory 1350b, based on the virtual address of the allocated area AR1 and a control signal generated by the memory management unit 1333. That is, a communication path connecting the first processor 1311, the interface circuit 1315, the bus 1320, the interface circuit 1335, the memory management unit 1333, and the buffer memory 1350b may be established.

In an embodiment, the access of the first processor 1311 to the area AR1, which is allocated to the first processor 1311, may not be limited and/or restricted. Therefore, the first processor 1311 may perform a read operation and a write operation on the allocated area AR1. The access of the second processor 1331 to the allocated area AR1 may be partially limited and/or restricted. For example, to prevent collision, a write-associated access of the second processor 1331 to the allocated area AR1 may be limited and/or restricted (e.g., not allowed and/or otherwise controlled).

In an embodiment, the second processor 1331 may release and/or recover the allocated area AR1. In the case where a storage space for performing an operation is insufficient, the second processor 1331 may release and/or recover the allocated area AR1. The access of the first processor 1311 to the allocated area AR1 may be limited and/or restricted upon releasing and/or recovering the allocated area AR1 (e.g., by the second processor 1331). For example, under control of the second processor 1331, the memory management unit 1333 may block an access to the buffer memory 1350b by an external processor except for the second processor 1331.

In an embodiment, before the allocated area AR1 is released and/or recovered, data which are stored in the allocated area AR1 and are used by the acceleration operation of the first processor 1311 may be backed up to the buffer memory 1350a. In this case, a handshake communication, such as a notification of a release and/or a recovery by the second processor 1331 and/or a notification of a backup execution completion by the first processor 1311, may precede the release and/or recovery of the allocated area AR1. However, a backup operation which is performed prior to releasing the allocated area AR1 is not limited thereto. For example, various ways to back up data stored in the allocated area AR1 of the buffer memory 1350b to the buffer memory 1350a safely may be used.

Figure 7:
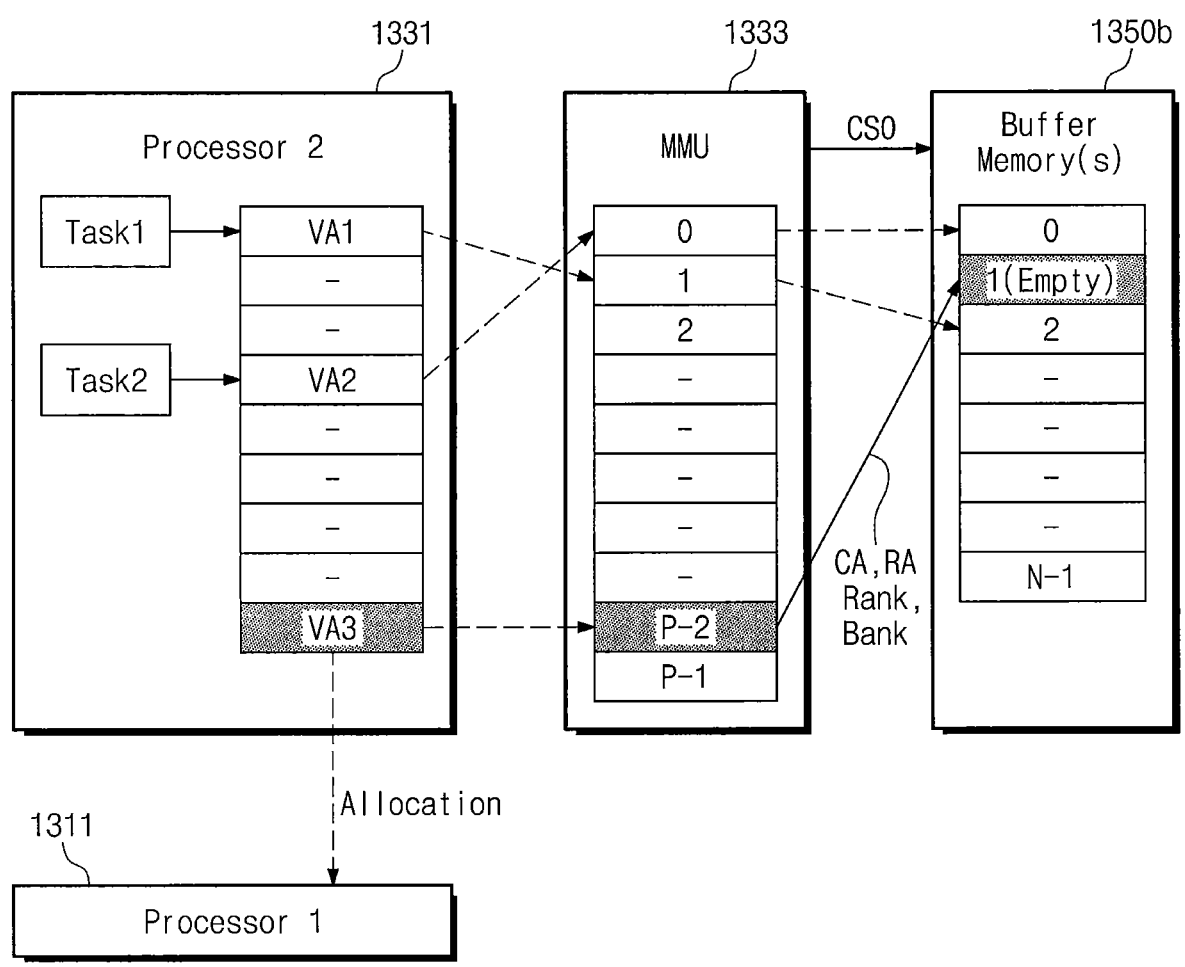
FIG. 7 conceptually illustrates how a first processor accesses a buffer memory through a virtual address managed by a second processor of FIG. 6.

FIG. 7 conceptually illustrates how a first processor 1311 accesses the buffer memory 1350b through a virtual address managed by a second processor 1331 of FIG. 6. For better understanding, a description will be given with reference to FIG. 6 together.

The first processor 1311 may perform the acceleration operation on a task allocated from the main processor 1100 and/or the acceleration operation according to a request of the main processor 1100 (refer to FIG. 1). In the case where a capacity of the dedicated buffer memory 1350a used by the first processor 1311 is insufficient and/or in the case where it is useful for the first processor 1311 to access the buffer memory 1350b, the second processor 1331 may allocate at least a portion of the buffer memory 1350b to the first processor 1311.

The second processor 1331 may perform an operation on a task allocated from the main processor 1100 and/or an operation according to a request of the main processor 1100.

In an embodiment, a first task Task1 and a second task Task2 are illustrated as a task associated with such an operation.

The second processor 1331 may manage virtual addresses corresponding to physical addresses of the buffer memory 1350b. For example, a virtual address managed by the second processor 1331 may include a virtual page number (e.g., out of P pages) and a page offset. The second processor 1331 may use a first virtual address VA1 to perform an operation associated with the first task Task1 and may use a second virtual address VA2 to perform an operation associated with the second task Task2. The second processor 1331 may transmit the virtual addresses VA1 and VA2 to the memory management unit 1333 for accessing the buffer memory 1350b with regard to the tasks Task1 and Task2.

The memory management unit 1333 may manage a physical address corresponding to a virtual address. For example, a physical address may include a physical frame number (e.g., out of N frames) and a frame offset. The memory management unit 1333 may map a virtual address onto a physical address of the buffer memory 1350b, which corresponds to an area which the second processor 1331 intends to access based on a physical address.

In an embodiment, in the case where the buffer memory 1350b is implemented with a DRAM, the mapped physical address of the buffer memory 1350b may include a column address CA, a row address RA, a rank address, a bank address, etc. In addition, a chip selection signal and a physical address are called a "control signal" for accessing the buffer memory 1350b.

The above-described mapping by the memory management unit 1333 is only provided as an example, and the inventive concepts are not limited thereto. That is, the inventive concepts may be applied various schemes to map a virtual address managed by a processor and a physical address of a buffer memory.

Continuing to refer to FIG. 7, the first processor 1311 may access a physical area of the buffer memory 1350b through a third virtual address VA3 allocated by the second processor 1331. In an embodiment, the third virtual address VA3 is illustrated as corresponding to a physical address "1" of the buffer memory 1350b. In an embodiment, in the case where a capacity of the buffer memory 1350a is insufficient, the second processor 1331 may allocate a virtual address corresponding to an unused area of the buffer memory 1350b to the first processor 1311. In an embodiment, in the case where the first processor 1311 intends to access the buffer memory 1350b for obtaining and/or using data, the second processor 1331 may allocate a virtual address of an area, in which the relevant data are stored, of the buffer memory 1350b to the first processor 1311.

In an embodiment, in the case where the first processor 1311 intends to access the buffer memory 1350b by using the third virtual address VA3 that was allocated, the memory management unit 1333 may transmit a chip selection signal CS0 to the buffer memory 1350b to select the buffer memory 1350b. The memory management unit 1333 may transmit addresses corresponding to the third virtual address VA3 to the buffer memory 1350b, and a communication path between the first processor 1311 and the buffer memory 1350b may be established.

Meanwhile, in the case where the access of the first processor 1311 to the buffer memory 1350b is freely permitted, various issues such as security, data loss, and collision may occur. This will be described with reference to FIGS. 8 to 10.

Figure 8:
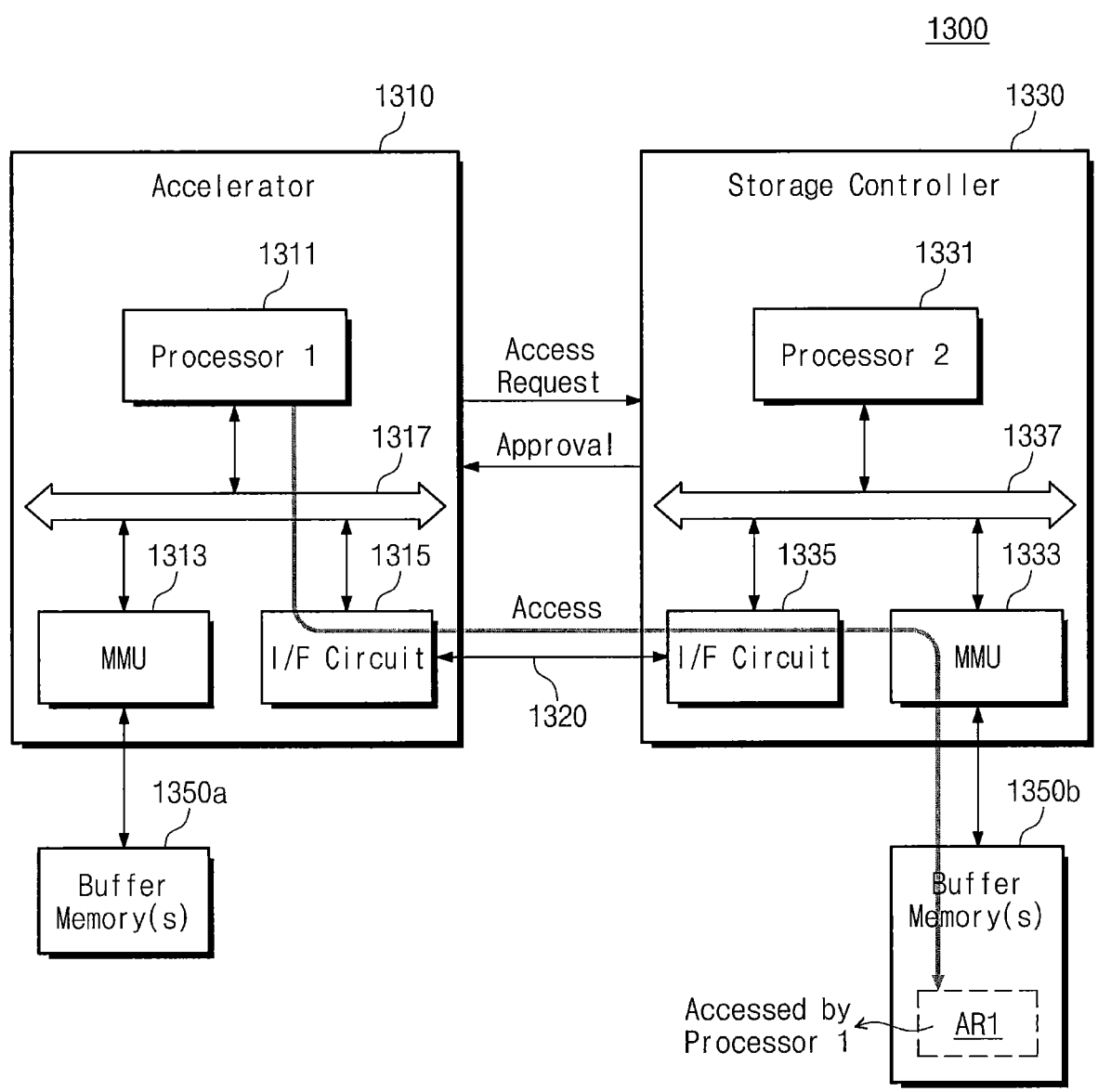
FIG. 8 illustrates an example configuration of a storage device of FIG. 6.

FIG. 8 illustrates an example configuration of a storage device 1300 of FIG. 6.

The first processor 1311 may perform the acceleration operation on a task allocated from the main processor 1100 (refer to FIG. 1) and/or the acceleration operation according to a request of the main processor 1100. The second processor 1331 may perform an operation on a task allocated from the main processor 1100 and/or an operation according to a request of the main processor 1100.

The first processor 1311 may transmit an access request for the buffer memory 1350*b* to the storage controller 1330 for obtaining an intermediate result or a final result of the operation processed by the second processor 1331. For example, the access request may be a read request. In an embodiment, the access request may be transmitted through the bus 1320 or a dedicated bus (not illustrated) between the first processor 1311 and the second processor 1331.

In the case where an access request of an external processor to the buffer memory 1350*b* is acceptable, the second processor 1331 allocates virtual addresses corresponding to physical addresses of the buffer memory 1350*b* to the first processor 1311. The first processor 1311 may access the buffer memory 1350*b* with reference to allocated virtual addresses. For example, in the case where data that requires security maintenance are absent from data stored in the buffer memory 1350*b*, the second processor 1331 may permit an access request to the first processor 1311.

In the case where an access request to the buffer memory 1350*b* by an external processor (e.g., the first processor 1311 and/or the main processor 1100 of FIG. 1) is not permitted, the second processor 1331 may deny an access request from the external processor. For example, in the case where data requiring security maintenance are present in the access-requested area, the access request from the external processor may be blocked.

In an embodiment, the second processor 1331 may separately manage one or more virtual addresses corresponding to data requiring security maintenance. For example, the second processor 1331 may separately manage the one or more virtual addresses corresponding to data requiring security maintenance by using an internal memory (e.g., a cache memory) of the second processor 1331, an internal memory (not illustrated) of the storage controller 1330, etc. An access of an external processor (e.g., the first processor 1311 and/or the main processor 1100 of FIG. 1) to a space where a separately managed virtual address is stored may not be permitted.

In an embodiment, in the case where all requests for an access of an external processor to the buffer memory 1350*b* are not permitted, under control of the second processor 1331, the memory management unit 1333 may not generate a chip selection signal (e.g., CS0 of FIG. 7) for selecting the buffer memory 1350*b*. In some embodiments, even though the buffer memory 1350*b* is already selected as an operation is performed by the second processor 1331, under control of the second processor 1331, the memory management unit 1333 may not map a physical address of the buffer memory 1350*b*.

In the case where some of requests for an access to the buffer memory 1350*b* by an external processor (e.g., the first processor 1311 and/or the main processor 1100 of FIG. 1) are permitted, the second processor 1331 may restrictively permit an access request from the external processor. For example, the second processor 1331 may allocate a virtual address of a partial area (e.g., AR1) where an access is permitted to the first processor 1311, and may separately manage a virtual address of an area where an access is not permitted. An access of an external processor associated with a separately managed virtual address may be blocked.

As described above, data stored in the buffer memory 1350*b* may be prevented from being unnecessarily copied by permitting all or a part of requests for an access (i.e., a read access) of the first processor 1311 to the buffer memory 1350*b*. As a result, a speed at which the storage controller 1330 operates may be improved.

Figure 9:
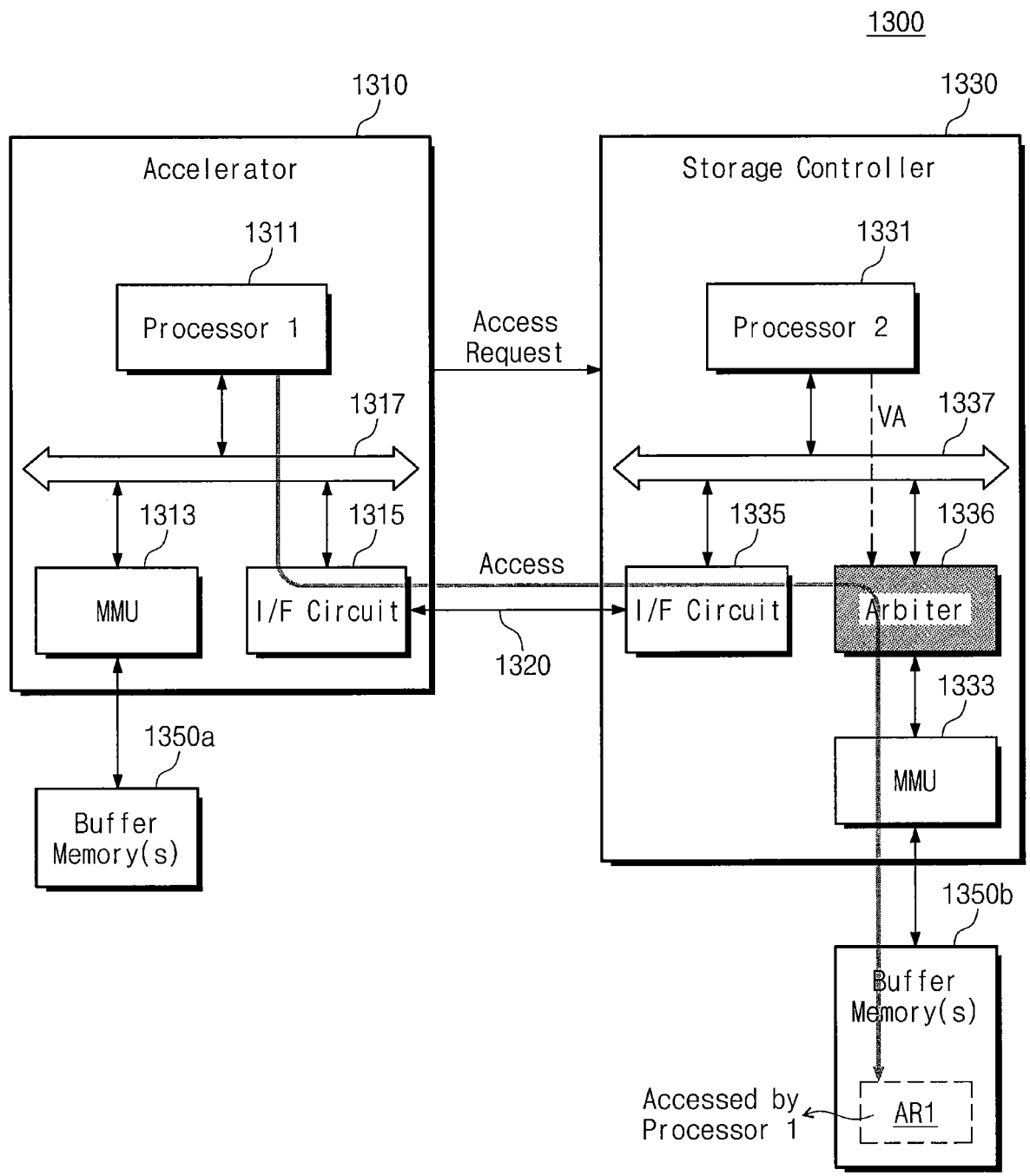
FIG. 9 illustrates an example configuration of a storage device of FIG. 6.

FIG. 9 illustrates an example configuration of a storage device 1300 of FIG. 6.

The embodiment of FIG. 9 is similar to the embodiment of FIG. 8. However, the storage controller 1330 may further include an arbiter 1336 that processes an access request from an external processor (e.g., the first processor 1311 and/or the main processor 1100 of FIG. 1).

The arbiter 1336 may process an access request of the external processor to the buffer memory 1350*b* under control of the second processor 1331. In an embodiment, the arbiter 1336 may be provided with an access-permitted virtual address(es) and an access-inhibited virtual address(es) from the second processor 1331. The arbiter 1336 may (restrictively) permit or inhibit an access from the external processor, based on the virtual addresses provided from the second processor 1331.

In an embodiment, the arbiter 1336 may be implemented with a separate dedicated circuit for processing an access request from the external processor. An embodiment is illustrated in FIG. 9 as the arbiter 1336 processes an access request between a bus 1337 and the memory management unit 1333, but the inventive concepts are not limited thereto. For example, an access request processing function that the arbiter 1336 performs may be implemented within the bus 1337. In an embodiment, a function of the arbiter 1336 may be implemented by software/firmware which is driven by the second processor 1331.

Figure 10:
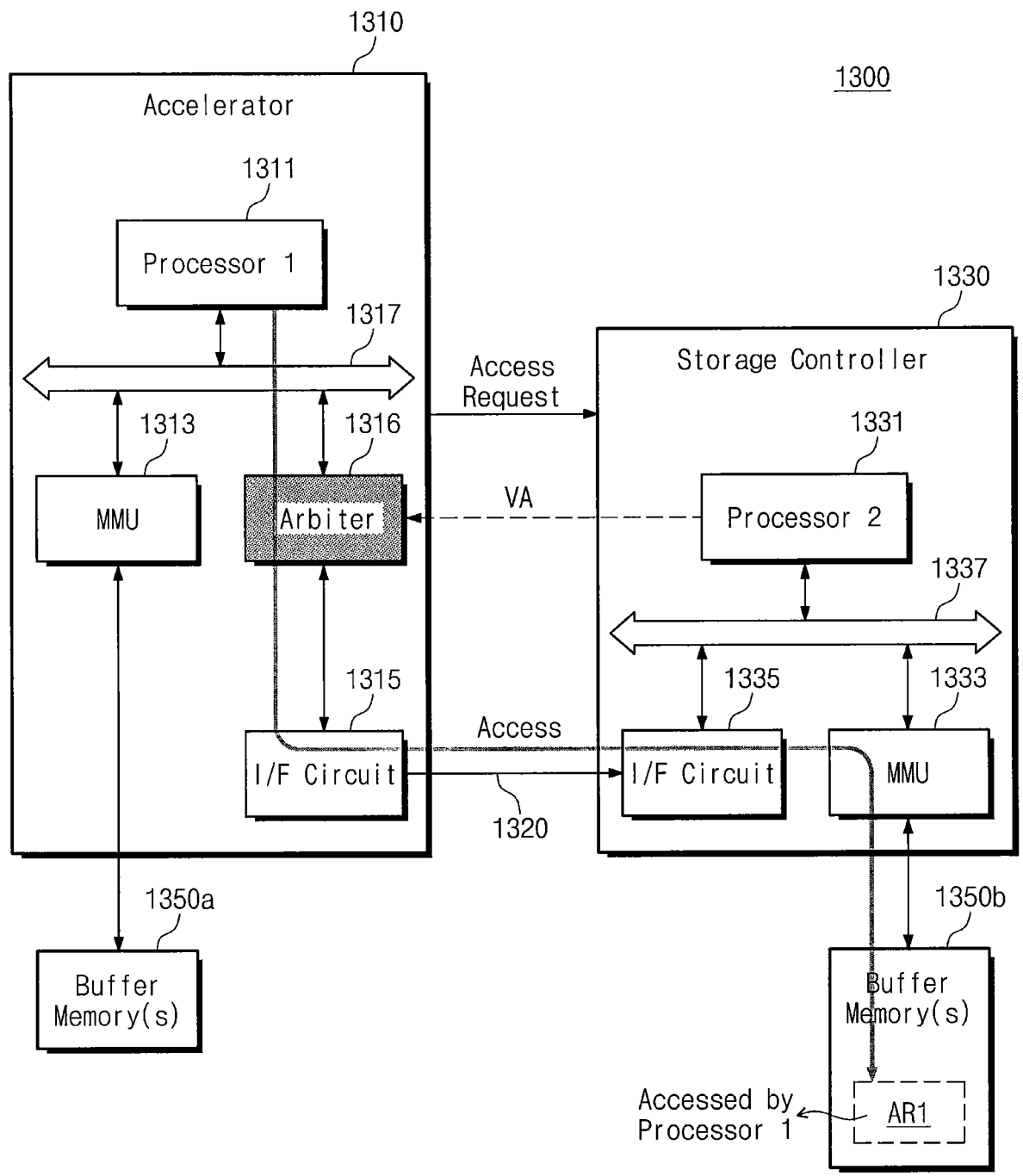
FIG. 10 illustrates an example configuration of a storage device of FIG. 6.

FIG. 10 illustrates an example configuration of a storage device 1300 of FIG. 6.

The embodiment of FIG. 10 is similar to the embodiment of FIG. 9. However, the accelerator 1310 may further include an arbiter 1316 which processes an access request from the first processor 1311.

The arbiter 1316 may process an access request of the first processor 1311 with regard to the buffer memory 1350*b*. In an embodiment, the arbiter 1316 may be provided with an access-permitted virtual address(es) and an access-inhibited virtual address(es) from the second processor 1331. The arbiter 1316 may (restrictively) permit or inhibit an access from the first processor 1311, based on the virtual addresses provided from the second processor 1331. As in the embodiment of FIG. 9, the arbiter 1316 may be implemented with a separate dedicated circuit for processing an access request from the first processor 1311 or may be implemented within a bus 1317.

Figure 11:
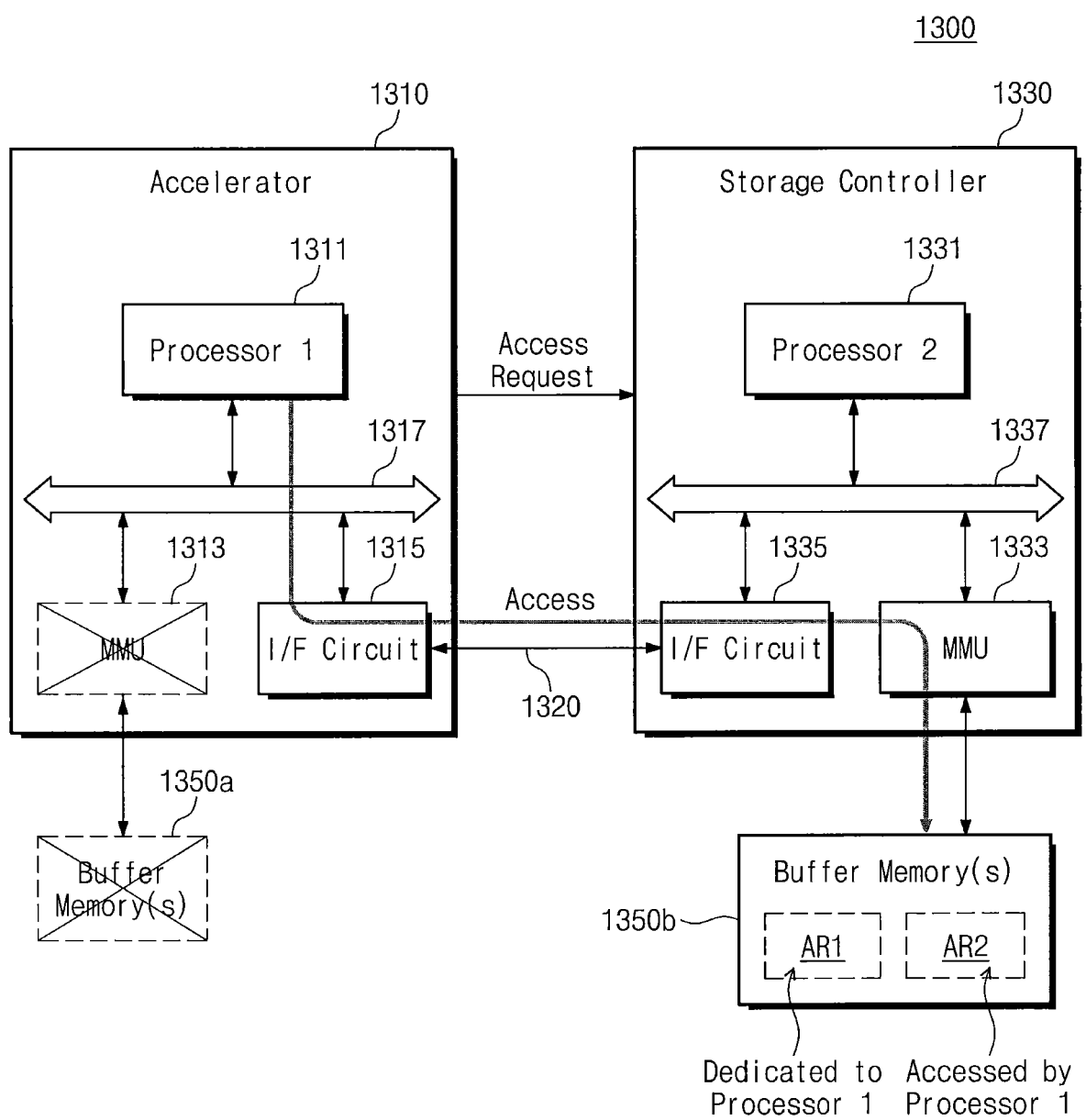
FIG. 11 illustrates an example configuration of a storage device of FIG. 3.

FIG. 11 illustrates an example configuration of a storage device 1300 of FIG. 3. However, unlike the above embodiments, the storage device 1300 may not include the buffer memory 1350*a* dedicated to the first processor 1311 and the memory management unit 1313 controlling the buffer memory 1350*a*.

In an embodiment, the second processor 1331 may allocate the first area AR1 of the buffer memory 1350*b* to a dedicated area of the first processor 1311. The second processor 1331 may provide virtual addresses corresponding to the first area AR1 to the first processor 1311. In some embodiments, the second processor 1331 may separately manage the virtual addresses corresponding to the first area AR1 by using an internal memory (e.g., a cache memory in the second processor 1331 or an internal memory of the storage controller 1330), and may permit an access of the first processor 1311 to the internal memory. The first processor 1311 may access the first area AR1 with reference to the virtual addresses provided from the second processor 1331.

In an embodiment, the access of the first processor 1311 to the first area AR1 may be associated with a write operation and/or a read operation. That is, the access of the first processor 1311 to the first area AR1 may not be limited and/or restricted. An access of the second processor 1331 to the first area AR1 may be partially limited and/or restricted. For example, only a read access of the second processor 1331 may be permitted.

In an embodiment, the second processor 1331 may additionally permit an access of the first processor 1311 to a second area AR2 of the buffer memory 1350b. In an embodiment, in the case where a capacity of the first area AR1 is insufficient for the first processor 1311 to perform the acceleration operation, the second processor 1331 may additionally allocate the second area AR2 to the first processor 1311. This is similar to permission of the access of the first processor 1311 described in the embodiment of FIG. 6. Thus, additional description will be omitted to avoid redundancy.

In an embodiment, in the case where the first processor 1311 intends to access the buffer memory 1350b for obtaining an intermediate result or a final result of the operation performed by the second processor 1331, the second processor 1331 may permit an access of the first processor 1311 to the buffer memory 1350b. However, due to a security issue, an access to all areas of the buffer memory 1350b may not be permitted, but an access to a partial area (e.g., the second area AR2) may be only permitted. This is similar to permission of the access of the first processor 1311 described in the embodiment of FIG. 8. Thus, additional description will be omitted to avoid redundancy.

In addition, as in the above embodiments of FIGS. 9 and 10, the accelerator 1310 or the storage controller 1330 may include an arbiter (not illustrated) that processes an access request of the first processor 1311 to the buffer memory 1350b. The arbiter may process an access request of an external processor (e.g., the first processor 1311 or the main processor 1100 of FIG. 1) to the buffer memory 1350b. A configuration and an operation of the arbiter are similar to those described in FIGS. 9 and 10, and thus, additional description will be omitted to avoid redundancy.

Figure 12:
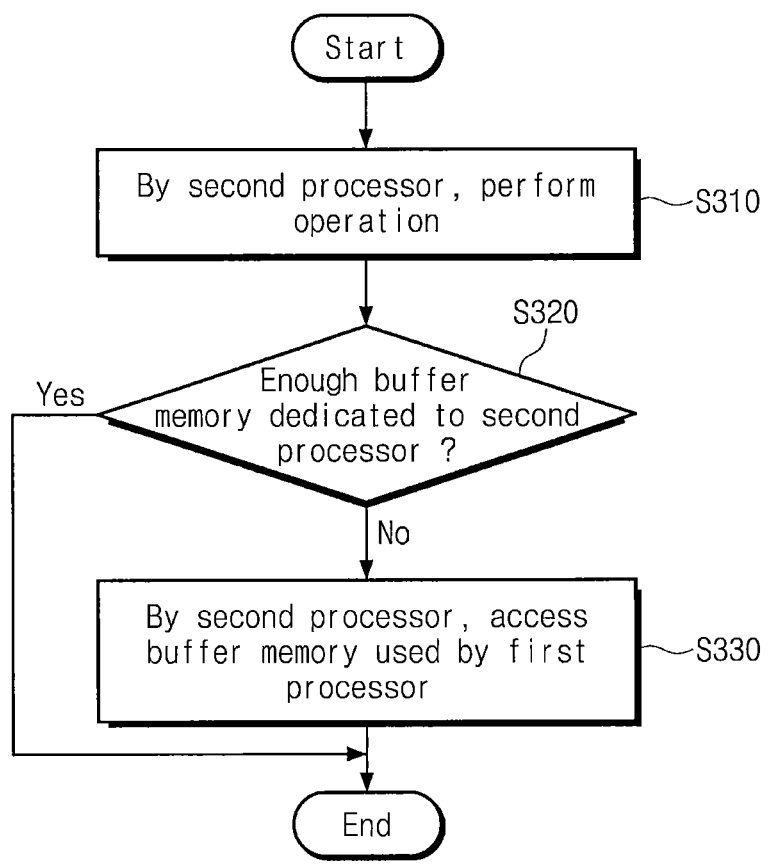
FIG. 12 is a flowchart illustrating an operating method of a storage device of FIG. 3.

FIG. 12 is a flowchart illustrating an operating method of a storage device 1300 of FIG. 3. For better understanding, a description will be given with reference to FIG. 3 together.

In operation S310, the second processor 1331 may perform an operation on a task allocated from the main processor 1100 (refer to FIG. 3) and/or an operation according to a request of the main processor 1100.

In operation S320, whether a capacity of the buffer memory 1350b dedicated to the second processor 1331 is sufficient to perform an operation is determined. When the remaining capacity of the buffer memory 1350b is sufficient (Yes), the operation of the second processor 1331 may be continuously performed; when the remaining capacity of the buffer memory 1350b is insufficient (No), operation S330 may be performed.

In operation S330, the second processor 1331 may access a space of the buffer memory 1350a allocated to the second processor 1331 and may use the allocated space as a space for performing the operation. In an embodiment, the second processor 1331 may perform read and/or write operations on the space of the buffer memory 1350a that is allocated.

Figure 13:
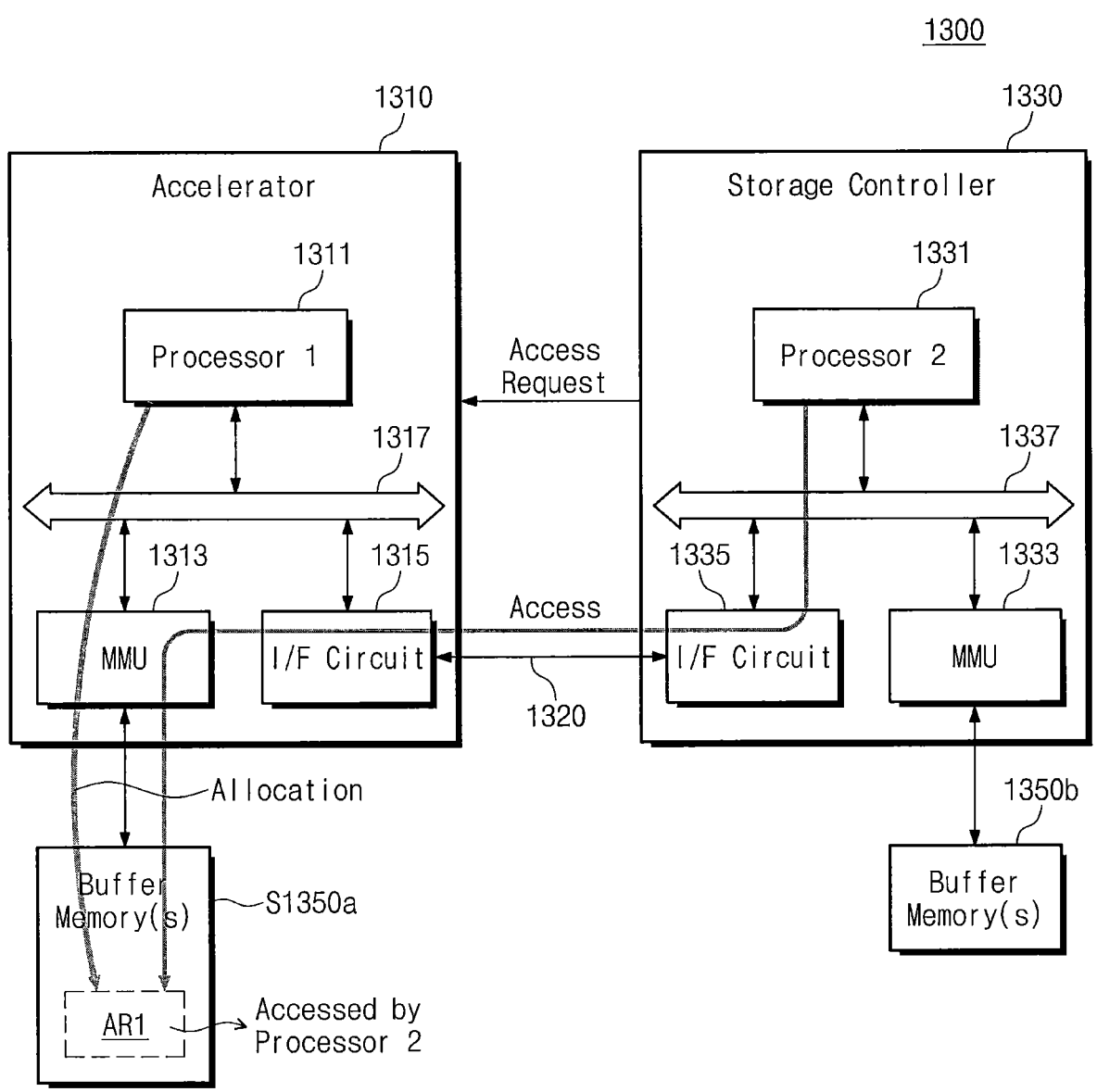
FIG. 13 illustrates an example configuration of a storage device of FIG. 3.

FIG. 13 illustrates an example configuration of a storage device 1300 of FIG. 3. In an embodiment, in the embodiment of FIG. 13, a way to secure an additional memory in the case where a capacity of the buffer memory 1350b used by the storage controller 1330 is insufficient will be described.

The second processor 1331 may perform an operation on a task allocated from the main processor 1100 (refer to FIG. 3) and/or an operation according to a request of the main processor 1100. In the case where a capacity of the buffer memory 1350b is insufficient while performing the operation, the second processor 1331 may request an access to the buffer memory 1350a from the first processor 1311. The first processor 1311 may allocate an unused area AR1 of the buffer memory 1350a to the second processor 1331. The second processor 1331 may access the area AR1 with reference to an allocated virtual address. For example, the second processor 1331 may perform read and/or write operations on the area AR1, and an access of the first processor 1311 to the area AR1 may be limited and/or restricted.

Figure 14:
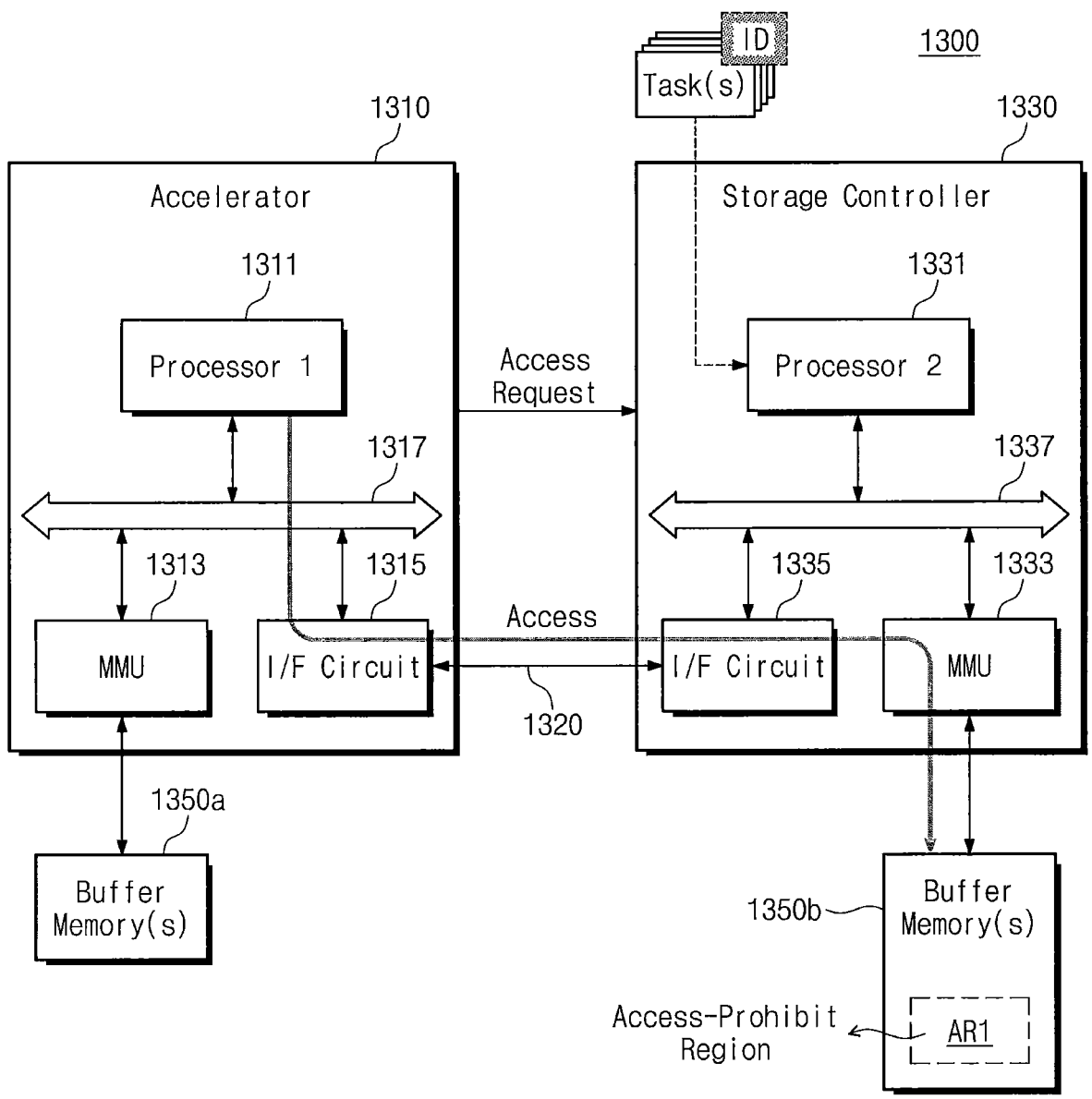
FIG. 14 illustrates an example configuration of a storage device of FIG. 3.

FIG. 14 illustrates an example configuration of a storage device 1300 of FIG. 3. In the embodiment of FIG. 14, how the first processor 1311 accesses the buffer memory 1350b based on an ID added to a task will be described.

The main processor 1100 (refer to FIG. 1) may add an ID to a specific task and may distribute the ID-added task to the storage controller 1330. The ID may indicate that an access of an external processor is permitted or inhibited with regard to the specific task.

In an embodiment, the ID may indicate that an access of an external processor to an intermediate result or a final result associated with the ID-added task is not permitted. For example, in the case where an intermediate result or a final result associated with the ID-added task is stored in a specific area AR1 of the buffer memory 1350b, an access of the external processor (e.g., the first processor 1311 and/or the main processor 1100 (refer to FIG. 1)) to the area AR1 may not be permitted.

In some embodiments, the ID may indicate that an access of an external processor to an intermediate result or a final result associated with the ID-added task is permitted. For example, in the case where an intermediate result or a final result associated with the ID-added task is stored in a specific area AR1 of the buffer memory 1350b, an access of the external processor (e.g., the first processor 1311 or the main processor 1100 (refer to FIG. 1)) to the area AR1 may be permitted.

As an access of an external processor to the buffer memory 1350b is restrictively permitted by adding an ID to a task distributed to the storage controller 1330, data may be prevented from being unnecessarily copied from the buffer memory 1350b to the buffer memory 1350a, and data requiring security may be prevented from being leaked.

Meanwhile, the inventive concepts may be identically applied to the case where the main processor 1100 (refer to FIG. 1) adds an ID to a specific task and distributes the ID-added task to the accelerator 1310. In this case, an intermediate result or a final result of the acceleration operation by the accelerator 1310 may be stored in the buffer memory 1350a, and an access of the second processor 1331 to the buffer memory 1350a may be restrictively permitted responsive to whether an ID exists.

Figure 15:
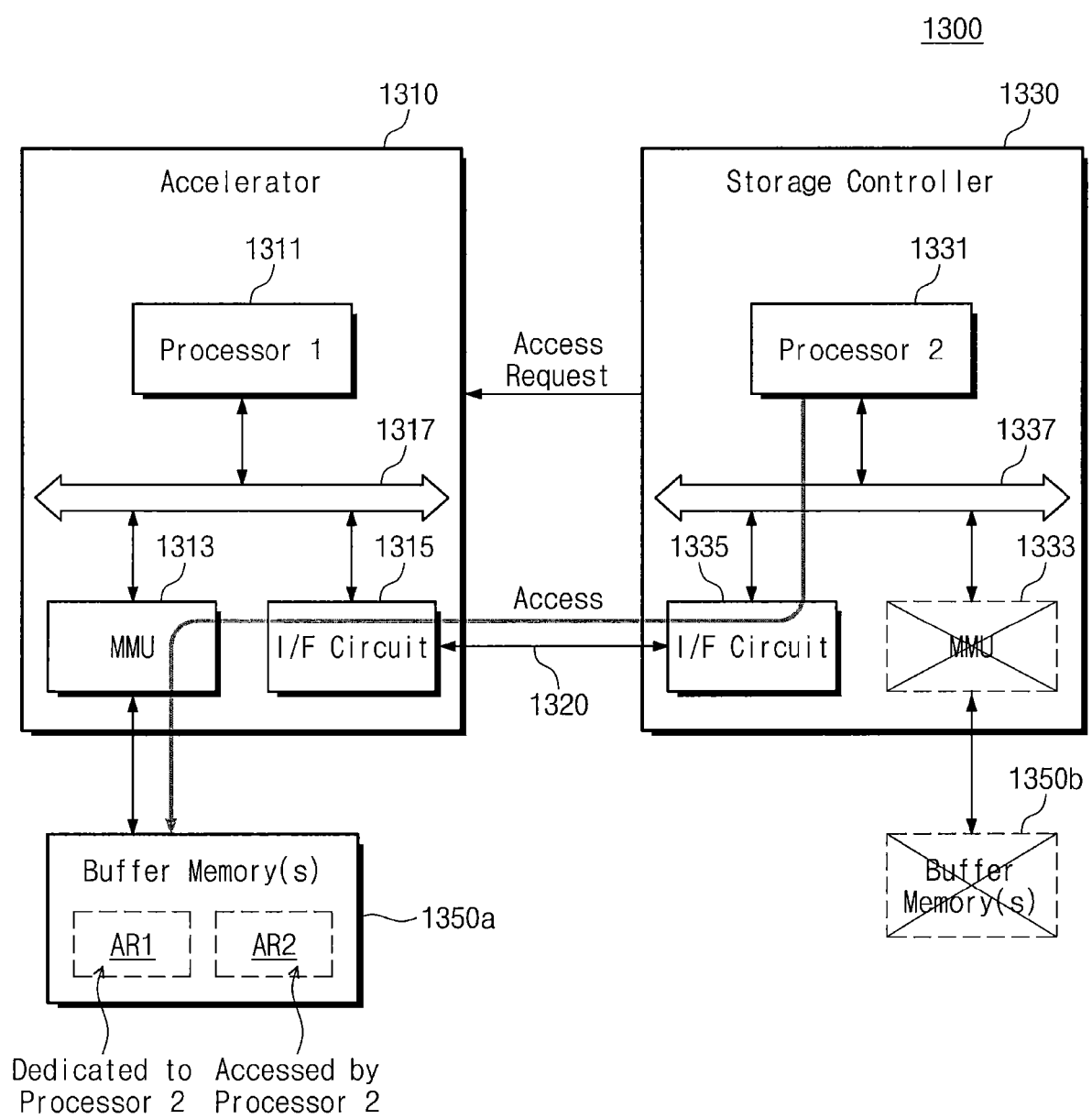
FIG. 15 illustrates an example configuration of a storage device of FIG. 3.

FIG. 15 illustrates an example configuration of a storage device 1300 of FIG. 3. However, unlike the above embodiments, the storage device 1300 may not include the buffer memory 1350b dedicated to the second processor 1331 and the memory management unit 1333 controlling the buffer memory 1350b.

In an embodiment, the first processor 1311 may allocate a first area AR1 of the buffer memory 1350a to be a dedicated area of the second processor 1331. The first processor 1311 may provide virtual addresses corresponding to the first area AR1 to the second processor 1331. In some embodiments, the first processor 1311 may separately manage the virtual addresses corresponding to the first area AR1 by using an internal memory (e.g., a cache memory in the first processor 1311 or an internal memory of the storage controller 1330), and may permit an access of the second processor 1331 to the internal memory. The second processor 1331 may access the first area AR1 with reference to the virtual addresses provided from the first processor 1311.

In an embodiment, the access of the second processor 1331 to the first area AR1 may be associated with a write operation and/or a read operation. That is, the access of the second processor 1331 to the first area AR1 may not be limited and/or restricted. An access of the first processor 1311 to the first area AR1 may be limited and/or restricted. For example, only a read access of the first processor 1311 to the first area AR1 may be permitted.

In an embodiment, the first processor 1311 may additionally permit an access of the second processor 1331 to a second area AR2 of the buffer memory 1350a. In an embodiment, in the case where a capacity of the first area AR1 is insufficient for the second processor 1331 to perform an operation, the first processor 1311 may additionally allocate the second area AR2 to the second processor 1331. This is similar to permission of the access of the first processor 1311 described in the embodiment of FIG. 6.

In an embodiment, in the case where the second processor 1331 intends to access the buffer memory 1350a for obtaining an intermediate result or a final result of the acceleration operation performed by the first processor 1311, the first processor 1311 may permit an access of the second processor 1331 to the buffer memory 1350a. However, due to a security issue, an access to all areas of the buffer memory 1350a may not be permitted, but an access to a partial area (e.g., the second area AR2) may be only permitted. This is similar to permission of the access of the first processor 1311 described in the embodiment of FIG. 8.

In addition, as in the above embodiments of FIGS. 9 and 10, the accelerator 1310 or the storage controller 1330 may include an arbiter (not illustrated) that processes an access request of the second processor 1331 to the buffer memory 1350a. The arbiter may process an access request of an external processor (e.g., the second processor 1331 and/or the main processor 1100 of FIG. 2) to the buffer memory 1350a.

Figure 16:
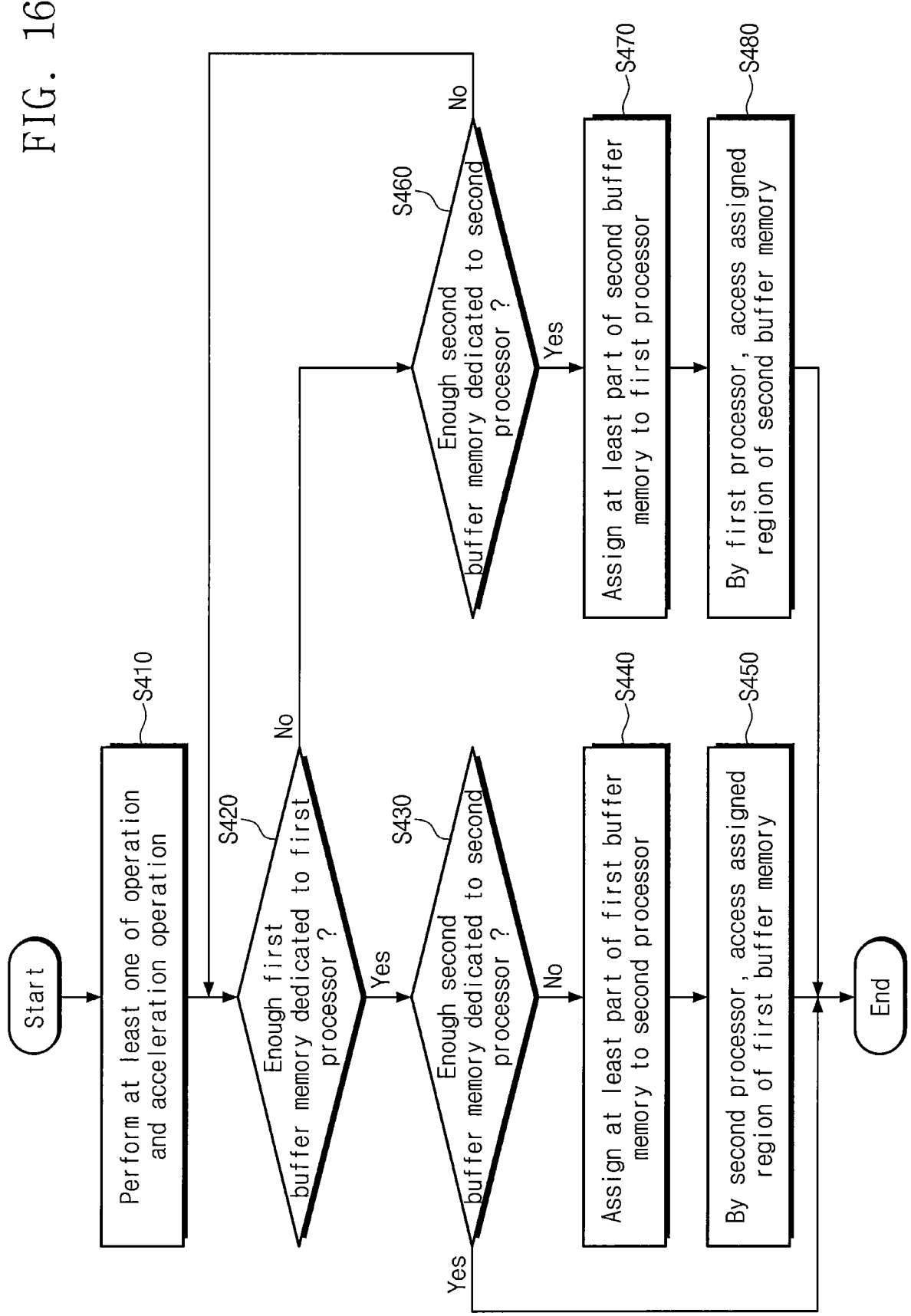
FIG. 16 is a flowchart illustrating an operating method of a storage device of FIG. 3.

FIG. 16 is a flowchart illustrating an operating method of a storage device 1300 of FIG. 3. A way to allocate free areas of the buffer memories 1350a and 1350b to the first and second processors 1311 and 1331 will be described with reference to FIG. 16. For better understanding, a description will be given with reference to FIG. 3 together.

In operation S410, at least one of the acceleration operation of the first processor 1311 and an operation of the second processor 1331 is performed. For example, the first processor 1311 may perform the acceleration operation on a task allocated from the main processor 1100 (refer to FIG. 1) and/or the acceleration operation according to a request of the main processor 1100. The second processor 1331 may perform an operation on a task allocated from the main processor 1100 and/or an operation according to a request of the main processor 1100.

In operation S420, whether a capacity of the buffer memory 1350a dedicated to the first processor 1311 is sufficient to perform the acceleration operation is determined. When the remaining capacity of the buffer memory 1350a is sufficient (Yes), operation S430 may be performed. In contrast, when the remaining capacity of the buffer memory 1350a is insufficient (No), operation S460 may be performed.

In operation S430, whether a capacity of the buffer memory 1350b dedicated to the second processor 1331 is sufficient to perform an operation is determined. The determination that the remaining capacity of the buffer memory 1350b is sufficient (Yes) means that sufficient (e.g., enough) memory is available to perform the acceleration operation of the first processor 1311 and the operation of the second processor 1331. Therefore, the method may be terminated.

In contrast, in operation S430, when the remaining capacity of the buffer memory 1350b is insufficient (No), operation S440 may be performed. In this case, the first processor 1311 may allocate a free space of the buffer memory 1350a to the second processor 1331 (S440), and the second processor 1331 may access the buffer memory 1350a through the above-described access schemes (S440).

In operation S460, whether a capacity of the buffer memory 1350b dedicated to the second processor 1331 is sufficient to perform an operation is determined. The determination that the remaining capacity of the buffer memory 1350b is insufficient (No) means that there is insufficient (e.g., not enough) memory to perform the acceleration operation of the first processor 1311 and the operation of the second processor 1331 are not secured. Therefore, the first processor 1311 performs the acceleration operation by using the buffer memory 1350a of an insufficient capacity, and the second processor 1331 performs the operation by using the buffer memory 1350b of an insufficient capacity.

In contrast, in operation S460, when the remaining capacity of the buffer memory 1350b is sufficient (Yes), operation S470 may be performed. In this case, the second processor 1331 may allocate a free space of the buffer memory 1350b to the first processor 1311 (S470), and the first processor 1311 may access the buffer memory 1350b through the above-described access schemes.

Meanwhile, in the embodiment of FIG. 16, a description is given as the capacity of the buffer memory 1350a is determined prior to the capacity of the buffer memory 1350b, but this is only provided as an example, and the inventive concepts are not limited thereto. That is, in another embodiment, the capacity of the buffer memory 1350b may be determined prior to the capacity of the buffer memory 1350a.

Figure 17:
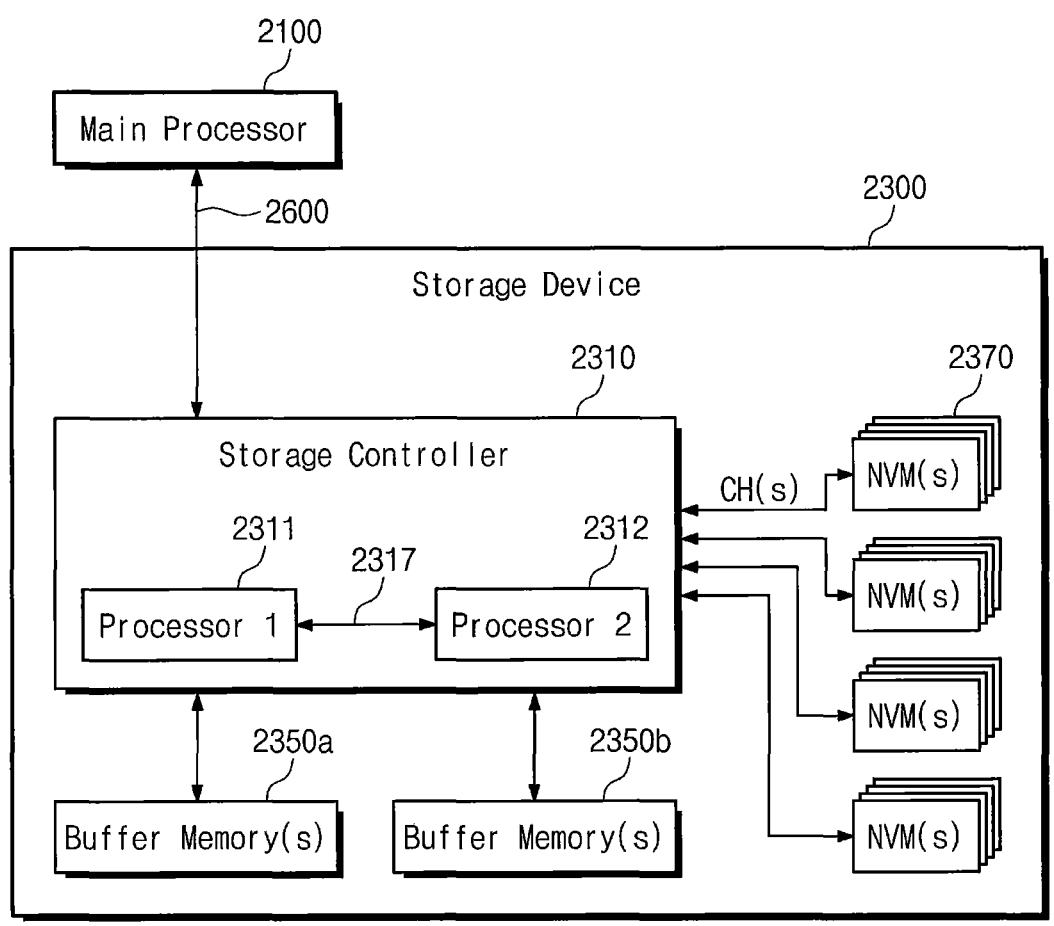
FIG. 17 illustrates an example configuration of a storage device of FIG. 1.

FIG. 17 illustrates an example configuration of the storage device 1300 of FIG. 1.

A storage device 2300 may include a storage controller 2310, buffer memories 2350a and 2350b, and nonvolatile memory devices 2370. Configurations and operations of the buffer memories 2350a and 2350b and the nonvolatile memory devices 2370 are substantially identical to those of the buffer memories 1350a and 1350b and the nonvolatile memory devices 1370 of FIG. 3, and thus, additional description will be omitted to avoid redundancy.

The storage controller 2310 may communicate with a main processor 2100 through a system bus 2600. The main processor 2100 and the system bus 2600 may operate substantially similarly as the main processor 1100 and the system bus 1600 of FIG. 3. The storage controller 2310 may be allocated tasks from the main processor 2100, and may perform an operation and/or an acceleration operation associated with the allocated tasks. In some embodiments, the storage controller 2310 may perform an operation and/or an acceleration operation on a task in response to a request of the main processor 2100.

The storage controller 2310 may include a first processor 2311 for performing the acceleration operation and a second processor 2312 for performing an operation. The first processor 2311 and the second processor 2312 may be heterogeneous processors. For example, the first processor 2311 may be implemented with a GPU, an NNPU, a FPGA, an ASIC, a DSP, etc., and the second processor 2312 may be implemented with a CPU. For example, the storage controller 2310 may be a system-on-chip (SoC) in which the first processor 2311 and the second processor 2312 are integrated. For example, in the case where the first processor 2311 is implemented with a FPGA, the first processor 2311 may be an embedded FPGA (eFPGA).

The first processor 2311 and the second processor 2312 may communicate with each other through a bus 2317. That is, the first processor 2311 and the second processor 2312 may be communicatively connected through the bus 2317. For example, the bus 2317 may support one or more of various interface protocols such as PCIe, NVMe, UFS, SATA, SAS, Gen-Z, CCIX, and OpenCAPI.

Figure 18:
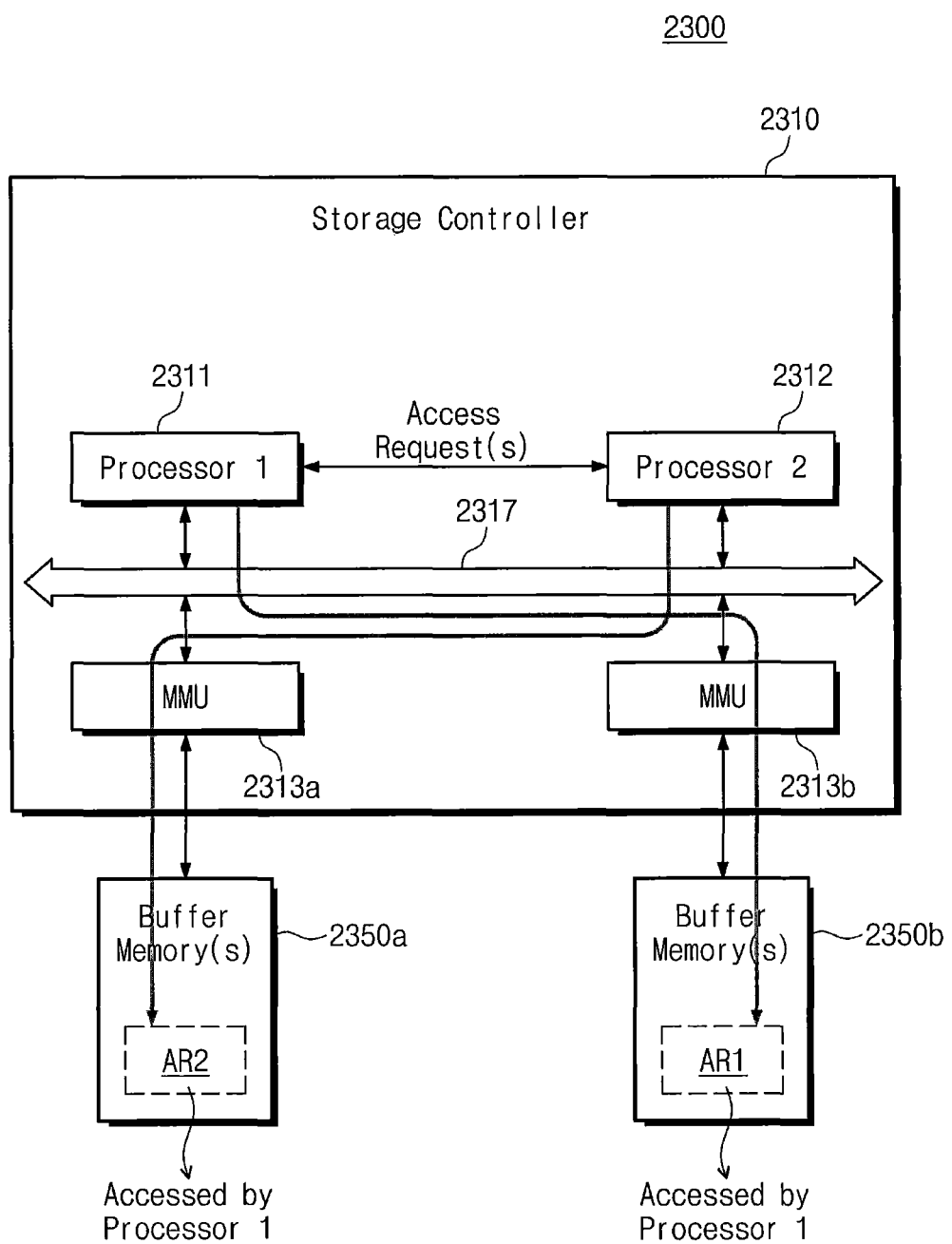
FIG. 18 illustrates an example configuration of a storage device of FIG. 17.

FIG. 18 illustrates an example configuration of the storage device 2300 of FIG. 17.

The storage device 2300 further includes memory management units 2313*a* and 2313*b* in addition to the first processor 2311 and the second processor 2312. The memory management units 2313*a* and 2313*b* may control data input/output operations of the buffer memories 2350*a* and 2350*b*, respectively. The memory management units 2313*a* and 2313*b* may translate virtual addresses respectively managed by first and second processors 2311 and 2312 to physical addresses. The translated physical addresses may indicate physical addresses of the buffer memories 2350*a* and 2350*b*. The buffer memories 2350*a* and 2350*b* may be buffer memories dedicated to the first processor 2311 and the second processor 2312, respectively.

The first processor 2311 may perform the acceleration operation on a task allocated from the main processor 2100 (refer to FIG. 17) and/or a task according to a request of the main processor 2100. The second processor 2312 may perform an operation on another task according to a request of the main processor 2100 and/or may accelerate an operation of the second processor 2312.

In the case where a space of the buffer memory 2350*a* is insufficient while the first processor 2311 performs the acceleration operation, the first processor 2311 may access a first area AR1 of the buffer memory 2350*b* based on the above-described methods. For example, an access of the first processor 2311 to the first area AR1 may include an access for a read operation and/or a write operation, and an access of the second processor 2312 to the first area AR1 may be partially limited and/or restricted. For example, a write access of the second processor 2312 to the first area AR1 may not be permitted.

The first processor 2311 may access the buffer memory 2350*b* for obtaining an intermediate result or a final result processed by the second processor 2312. In this case, the second processor 2312 may permit an access of the first processor 2311 to the buffer memory 2350*b* based on the above-described methods. However, due to a security issue, an access of the first processor 2311 to the buffer memory 2350*b* may be limited and/or restricted, and an access of the first processor 2311 may only be permitted to the area AR1.

Meanwhile, in the case where a space of the buffer memory 2350*b* is insufficient while the second processor 2312 performs an operation, the second processor 2312 may access a second area AR2 of the buffer memory 2350*a* based on the above-described methods. For example, an access of the second processor 2312 to the second area AR2 may include an access for a read operation and/or a write operation, and an access of the first processor 2311 to the second area AR2 may be partially limited and/or restricted. For example, a write access of the first processor 2311 to the second area AR2 may not be permitted.

As in the above description, the second processor 2312 may access the buffer memory 2350*a* for obtaining an intermediate result or a final result processed by the first processor 2311. In this case, the first processor 2311 may permit an access of the second processor 2312 to the buffer memory 2350*a* based on the above-described methods. However, due to a security issue, an access of the second processor 2312 to the buffer memory 2350*a* may be limited and/or restricted, and an access of the second processor 2312 may only be permitted to the area AR2.

According to the embodiments disclosed above, as heterogeneous processors communicate in a peer-to-peer manner, data exchange between a storage controller and an accelerator may be performed without intervention of a host processor or a host memory. In addition, since a processor directly accesses a buffer memory dedicated to another processor, data may be prevented and/or reduced from being copied unnecessarily. As a result, the performance of an accelerator-based storage device may be improved.

Figure 19:
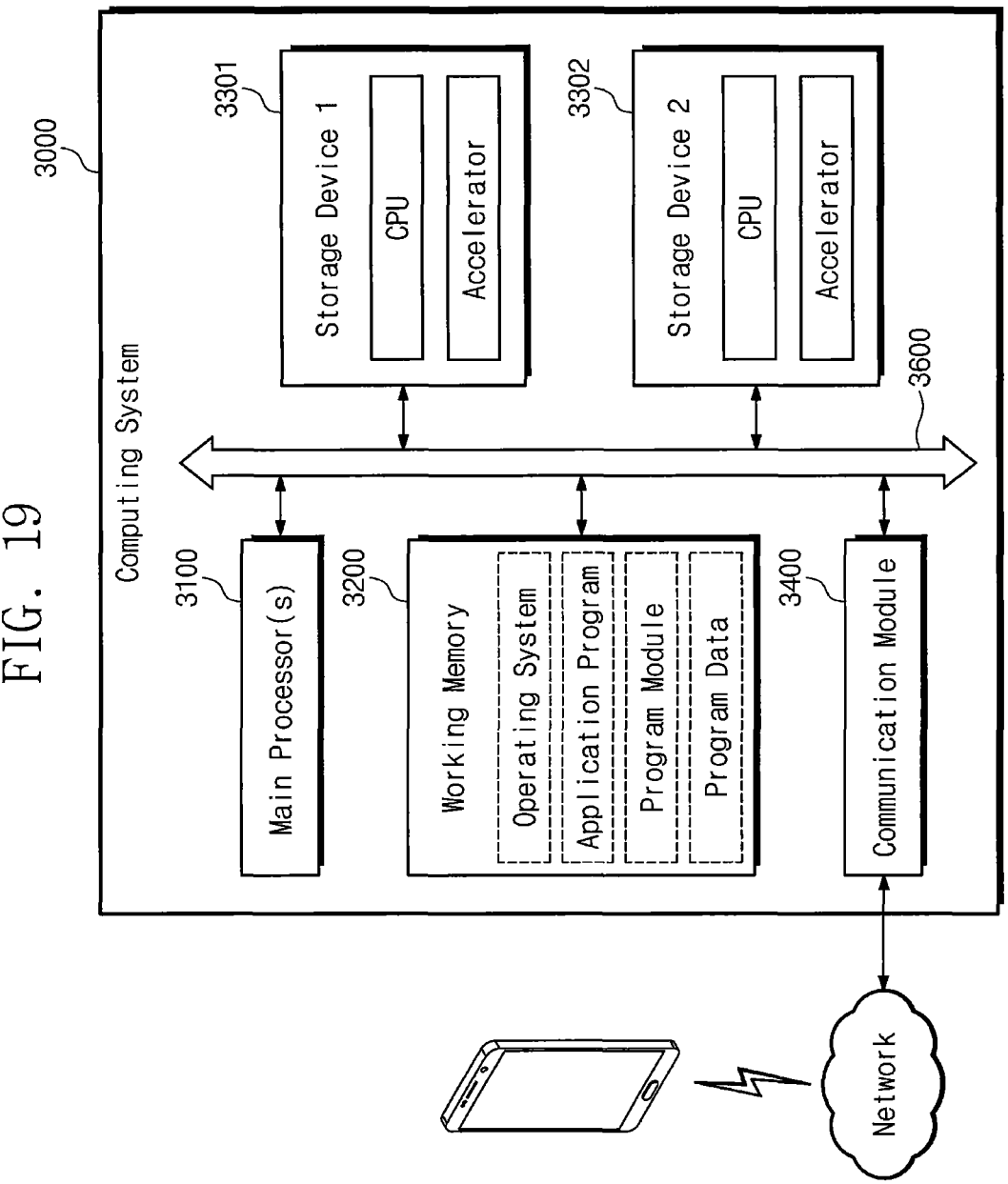
FIG. 19 illustrates a configuration of a computing system according to an example embodiment of the present disclosure.

FIG. 19 illustrates a configuration of a computing system 3000 according to an example embodiment of the present disclosure.

A computing system 3000 may include a main processor 3100, a working memory 3200, storage devices 3301 and 3302, and a communication module 3400, which are connected to a system bus 3600. In an embodiment, the computing system 3000 may be a server for providing a service to a user.

The main processor 3100 may process overall operations for executing an operating system, an application program, etc., which are resident on the working memory 3200. The storage devices 3301 and 3302 may store overall data used by the computing system 3000. For example, the storage devices 3301 and 3302 may store an operating system for operating the computing system 3000, an application program, various program modules, program data, user data, etc.

In booting or an operation of the computing system 3000, the operating system, the application program, the program modules, and data necessary to drive programs are loaded onto the working memory 3200 from the storage devices 3301 and 3302. The communication module 3400 may provide interfacing between the computing system 3000 and an external network.

The computing system 3000 may provide a service according to a request of the user. For example, the computing system 3000 may provide cloud services, such as IaaS (Infrastructure as a Service), PaaS (Platform as a Service), and/or SaaS (Software as a Service), and various services such as AI (Artificial Intelligence)-based voice recognition. In particular, in a service, which requires a complicated operation, such as an AI-based service provided by using data stored in the storage devices 3301 and 3302, accelerators of the storage devices 3301 and 3302 may perform acceleration operations for improving a speed at which the service is provided. In this case, the accelerators may access dedicated memories of CPUs of the storage devices 3301 and 3302 according to embodiments of the present disclosure. In some embodiments, the storage devices 3301 and 3302 of the computing system 3000 may be implemented based on the storage devices (e.g., storage devices 1300, 2300) disclosed herein.

According to example embodiments of the present disclosure, a processor may access a buffer memory dedicated to another processor, thus securing a memory space for an operation or an acceleration operation.

In addition, according to example embodiments of the present disclosure, the processor may access the buffer memory dedicated to another processor for obtaining data necessary for an operation or an acceleration operation, thus preventing and/or reducing an unnecessary copy of data.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

When a certain example embodiment may be implemented differently, a specific process order may be performed differently from the described order. For example, two consecutively described processes may be performed substantially at the same time or performed in an order opposite to the described order.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. A storage device configured to communicate with a main processor of an electronic system, the storage device comprising:
   an accelerator comprising a first processor and a first buffer memory; and
   a storage controller comprising a second processor different in type from the first processor and a second buffer memory that is separate from the first buffer memory, wherein the storage controller is configured to communicate with at least one nonvolatile memory through at least one channel, and wherein the storage controller is configured to use the second buffer memory as a working memory,
   wherein the second processor is configured to establish a first communication path between the first processor and the second buffer memory responsive to a request of the first processor, and
   wherein the first processor is configured to access the second buffer memory through the first communication path.

2. The storage device of claim 1, wherein, responsive to the request comprising a first type of access request to an unused area of the second buffer memory, the second processor is configured to allocate a virtual address corresponding to at least a portion of the unused area to the first processor,
   wherein the first processor is configured to access the unused area of the second buffer memory with reference to the allocated virtual address, and
   wherein an access of the second processor to the unused area is at least partially restricted.

3. The storage device of claim 1, wherein, responsive to the request comprising a second type of access request to an available area of the second buffer memory, the second processor is configured to allocate a virtual address corresponding to at least a portion of the available area to the first processor,
   wherein the first processor is configured to access the available area of the second buffer memory with reference to the allocated virtual address, and
   wherein the access of the first processor to the available area is at least partially restricted.

4. The storage device of claim 3, wherein the second processor is configured to separately manage virtual addresses, at which an access of an external processor is inhibited, from among virtual addresses of the second buffer memory.

5. The storage device of claim 3, wherein the storage controller further comprises:
an arbiter configured to manage an access of the first processor to the second buffer memory, based on the virtual address of the second buffer memory.

6. The storage device of claim 3, wherein the accelerator further comprises:
an arbiter configured to manage an access of the first processor to the second buffer memory, based on the virtual address of the second buffer memory.

7. The storage device of claim 1,
wherein the first processor is configured to establish a second communication path between the second processor and the first buffer memory responsive to a request of the second processor.

8. The storage device of claim 1, wherein the storage controller further comprises a memory management unit configured to map virtual addresses to physical addresses of the second buffer memory, and
wherein the memory management unit is configured to manage an access of the first processor to the second buffer memory, based on the virtual addresses of the second buffer memory managed by the second processor.

9. The storage device of claim 8, wherein the accelerator further comprises a first interface circuit configured to perform communication with the storage controller,
wherein the storage controller further comprises a second interface circuit configured to perform communication with the accelerator,
wherein the first communication path comprises the first interface circuit and the second interface circuit, and
wherein the first processor of the accelerator is further configured to access the second buffer memory through the first communication path using a first virtual address of the virtual addresses that are mapped by the memory management unit of the storage controller.

10. The storage device of claim 1, wherein a type of the first processor is one of a graphics processing unit (GPU), a neural network processing unit (NNPU), or a reconfigurable logic circuit, and
wherein a type of the second processor is a central processing unit (CPU).

11. A controller configured to communicate with a main processor of an electronic system, the controller comprising:
a first processor configured to use a first buffer memory, the first processor having a first type;
a second processor configured to use a second buffer memory that is separate from the first buffer memory, the second processor having a second type that is different from the first type of the first processor; and
a bus electrically coupled to the first processor and the second processor,
wherein the second processor is configured to establish a first communication path between the first processor and the second buffer memory responsive to a request of the first processor, the first communication path including a portion of the bus.

12. The controller of claim 11, wherein, responsive to the request comprising a first type of access request to an unused area of the second buffer memory, the second processor is configured to allocate a virtual address corresponding to at least a portion of the unused area to the first processor,
wherein the first processor is configured to access the unused area of the second buffer memory with reference to the allocated virtual address, and
wherein an access of the second processor to the unused area is at least partially restricted.

13. The controller of claim 11, wherein, responsive to the request comprising a second type of access request to an available area of the second buffer memory, the second processor is configured to allocate a virtual address corresponding to at least a portion of the available area to the first processor,
wherein the first processor is configured to access the available area of the second buffer memory with reference to the allocated virtual address, and
wherein the access of the first processor to the available area is at least partially restricted.

14. The controller of claim 11, further comprising:
a memory management unit configured to map virtual addresses to physical addresses of the second buffer memory,
wherein the memory management unit is configured to manage an access of the first processor to the second buffer memory, based on the virtual addresses of the second buffer memory managed by the second processor.

15. The controller of claim 11, wherein a type of the first processor is one of a graphics processing unit (GPU), a neural network processing unit (NNPU), or an FPGA, and
wherein a type of the second processor comprises a central processing unit (CPU).

16. A storage device configured to communicate with a main processor of an electronic system, the storage device comprising:
an accelerator comprising a first processor configured to use a first buffer memory as a working memory; and
a storage controller comprising a second processor that is different in type from the first processor, the second processor configured to use, as a working memory, a second buffer memory that is separate from the first buffer memory,
wherein the first processor is configured to establish a first communication path between the second processor and the first buffer memory responsive to a request of the second processor, and wherein the second processor is configured to establish a second communication path between the first processor and the second buffer memory responsive to a request of the first processor.

17. The storage device of claim 16, wherein the first processor is one of a graphics processing unit (GPU), a neural network processing unit (NNPU), and/or an FPGA, and wherein the second processor is a central processing unit (CPU).

18. The storage device of claim 16, wherein the request of the first processor comprises a request to access an unused area of the second buffer memory, and wherein the second processor is configured to allocate a virtual address corresponding to at least a portion of the unused area to the first processor.

19. The storage device of claim 18, wherein the first processor is configured to access the unused area of the second buffer memory with reference to the allocated virtual address, and wherein the access by the second processor to the unused area is at least partially restricted.

20. The storage device of claim 16, wherein the request of the first processor comprises a request to access an available area of the second buffer memory, wherein the second processor is configured to allocate a virtual address corresponding to at least a portion of the available area to the first processor in response to the request, and wherein the access by the first processor to the available area is at least partially restricted.

\* \* \* \* \*